United States Patent
Liu

(10) Patent No.: US 8,527,931 B2
(45) Date of Patent: Sep. 3, 2013

(54) AUTOMATIC CIRCUIT DESIGN APPARATUS AND METHOD

(75) Inventor: Yu Liu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 559 days.

(21) Appl. No.: 12/565,951

(22) Filed: Sep. 24, 2009

(65) Prior Publication Data

US 2010/0083196 A1 Apr. 1, 2010

(30) Foreign Application Priority Data

Sep. 26, 2008 (JP) .................................. 2008-248755
May 18, 2009 (JP) .................................. 2009-120305

(51) Int. Cl.
*G06F 17/50* (2006.01)

(52) U.S. Cl.
USPC ............................ 716/132; 716/101; 716/126

(58) Field of Classification Search
USPC ......................................... 716/101, 126, 132
See application file for complete search history.

(56) References Cited

U.S. PATENT DOCUMENTS

| | | | |
|---|---|---|---|
| 6,606,729 | B2 | 8/2003 | Gross et al. |
| 6,757,873 | B2 | 6/2004 | Yamaguchi |
| 7,383,521 | B2 * | 6/2008 | Smith et al. .................... 716/114 |
| 7,921,383 | B1 * | 4/2011 | Wei ................. 716/54 |
| 2002/0037596 | A1 | 3/2002 | Yamaguchi |
| 2003/0066034 | A1 | 4/2003 | Gross et al. |
| 2009/0182695 | A1 | 7/2009 | Yanami et al. |

FOREIGN PATENT DOCUMENTS

| | | |
|---|---|---|
| JP | 4-260973 A | 9/1992 |
| JP | 6-139303 A | 5/1994 |
| JP | 6-348683 A | 12/1994 |
| JP | 7-066294 A | 3/1995 |
| JP | 2002-110489 A | 4/2002 |
| JP | 2004-061372 A | 2/2004 |
| JP | 2004-118719 A | 4/2004 |
| JP | 2004-145410 A | 5/2004 |
| JP | 2005-070849 A | 3/2005 |
| JP | 2006-293483 A | 10/2006 |
| JP | 2007-144979 A | 6/2007 |
| JP | 2007-148650 A | 6/2007 |
| JP | 2008-502033 A | 1/2008 |
| JP | 2008-507038 A | 3/2008 |
| WO | WO-2005/114503 | 12/2005 |
| WO | WO-2006/017247 | 2/2006 |

OTHER PUBLICATIONS

Fletcher, Roger "Practical Methods of Optimization", John Wiley & Sons, Second Edition Mar. 1991, p. 16-19.

(Continued)

*Primary Examiner* — Thuan Do
(74) *Attorney, Agent, or Firm* — Fujitsu Patent Center

(57) ABSTRACT

By carrying out circuit simulations, paretos that are non-dominated solutions in a solution specification space for respective items in the requirement specification are obtained for all of circuit configurations having possibility that requirement specification is satisfied, and a provisional optimal solution, which is on a pareto curved surface identified by the obtained paretos and whose distance with the requirement specification is shortest, is identified. Furthermore, a circuit configuration corresponding to the provisional optimal solution is identified and the provisional optimal solution is mapped to values of circuit parameters. Then, the pertinent circuit configuration and values of the circuit parameters, which are obtained by the mapping, are outputted.

10 Claims, 24 Drawing Sheets

(56) References Cited

OTHER PUBLICATIONS

Seshadri, Aravind "NSGA-II: A multi-objective optimization algorithm", http://www.mathworks.com/matlabcentral/fileexchange/10429 May 19, 2006.

Tiwary, Saurabh K. et al., "Generation of Yield-Aware Pareto Surfaces for Hierarchical Circuit Design Space Exploration", In DAC 2006. Proceedings of the 43rd annual Design Automation Conference, Jul. 24-28, 2006 Jul. 2006, p. 31-36.

Yu, Guo et al., "Yield-Aware Analog Integrated Circuit Optimization Using Geostatistics Motivated Performance Modeling", In ICCAD 2007. Proceedings of the 2007 IEEE/ACM International Conference on Computer-Aided Design, Nov. 5-8, 2007 Nov. 2007, p. 464-469.

Katsurayama et al "On the Portfolio Selection Model Applying to Historical Data" Japan, Japan Industrial Management Association, Dec. 15, 1995, vol. 46, No. 5, pp. 395-400, with Partial English-language Translation.

Japanese Office Action mailed Sep. 25, 2012 for corresponding Japanese Application No. 2009-120305, with English-language Translation.

* cited by examiner

| | | |
|---|---|---|
| DIRECT CONSTRAINT CONDITION | DESIGN RULE | $65nm \leq L \leq 2um$ |
| | | $0.1um \leq W \leq 10um$ |
| | MATCHING | $W1 = W2$ |
| | SYSTEM REQUIREMENT | $-40°C \leq T 90°C$ |
| INDIRECT CONSTRAINT CONDITION | MANDATORY PERFORMANCE | $Area \leq 0.5mm^2$ |

| ITEM | REQUIREMENT |
|---|---|
| CONSUMED ELECTRIC CURRENT | $\leq 5mA$ |
| THD (Total harmonic distortion) | $\leq -40dB$ |
| DC GAIN | $-3dB \sim 2dB$ |
| BANDWIDTH | $\geq 1GHz$ |

| CIRCUIT CONFIGURATION | DESIGN VARIABLE 1 | DESIGN VARIABLE 2 | DESIGN VARIABLE 3 | ... | PERFORMANCE ITEM 1 | PERFORMANCE ITEM 2 | PERFORMANCE ITEM 3 | PERFORMANCE ITEM 4 | ... |
|---|---|---|---|---|---|---|---|---|---|
| CIRCUIT 1 | ZA1 | ZB1 | ZC1 | | A1 | B1 | C1 | D1 | |
| CIRCUIT 1 | ZA2 | ZB2 | ZC2 | | A2 | B2 | C2 | D2 | |
| CIRCUIT 1 | ZA3 | ZB3 | ZC3 | | A3 | B3 | C3 | D3 | |
| CIRCUIT 1 | ZA4 | ZB4 | ZC4 | | A4 | B4 | C4 | D4 | |
| CIRCUIT 1 | ZA5 | ZB5 | ZC5 | | A5 | B5 | C5 | D5 | |
| ... | ... | ... | ... | ... | ... | ... | ... | ... | ... |
| CIRCUIT 2 | ZA6 | ZB6 | ZC6 | | A6 | B6 | C6 | D6 | |
| CIRCUIT 2 | ZA7 | ZB7 | ZC7 | | A7 | B7 | C7 | D7 | |
| CIRCUIT 2 | ZA8 | ZB8 | ZC8 | | A8 | B8 | C8 | D8 | |
| CIRCUIT 2 | ZA9 | ZB9 | ZC9 | | A9 | B9 | C9 | D9 | |
| CIRCUIT 2 | ZA10 | ZB10 | ZC10 | | A10 | B10 | C10 | D10 | |
| ... | ... | ... | ... | ... | ... | ... | ... | ... | ... |

FIG.9

| CIRCUIT CONFIGURATION | DESIGN VARIABLE 1 | DESIGN VARIABLE 2 | DESIGN VARIABLE 3 | ... | PERFORMANCE ITEM 1 | PERFORMANCE ITEM 2 | PERFORMANCE ITEM 3 | PERFORMANCE ITEM 4 | ... |
|---|---|---|---|---|---|---|---|---|---|
| CIRCUIT 1 | ZA1 | ZB1 | ZC1 | ... | A1 | B1 | C1 | D1 | |
| CIRCUIT 1 | ZA2 | ZB2 | ZC2 | ... | A2 | B2 | C2 | D2 | |
| CIRCUIT 2 | ZA9 | ZB9 | ZC9 | | A9 | B9 | C9 | D9 | |
| CIRCUIT 2 | ZA10 | ZB10 | ZC10 | | A10 | B10 | C10 | D10 | |
| ... | ... | ... | ... | | ... | ... | ... | ... | |

FIG.15

| PVT CORNER SETTING ITEM | MIN | TYP | MAX |
|---|---|---|---|
| Leff | min1 | typ1 | max1 |
| Vth | min2 | typ2 | max2 |
| Tox | min3 | typ3 | max3 |
| PolyCD |  | typ4 |  |
| rshncd | min5 | typ5 | max5 |
| rshpcd | min6 | typ6 | max6 |
| ⋮ | ⋮ | ⋮ | ⋮ |
| V | min7 | typ7 | max7 |
| T | min8 | typ8 | max8 |

FIG.21

| PVT CORNER SETTING ITEM | APPEARANCE RANGE DATA | COMBINATION INFO. |
|---|---|---|
| Leff | GAUSS, $\mu_1, \sigma_1$ | min,max |
| Vth | GAUSS, $\mu_2, \sigma_2$ | min,max |
| Tox | GAUSS, $\mu_3, \sigma_3$ | min,typ,max |
| PolyCD | GAUSS, $\mu_4, \sigma_4$ | min,max |
| rshncd | GAUSS, $\mu_5, \sigma_5$ | typ |
| rshpcd | GAUSS, $\mu_6, \sigma_6$ | min,max |
| ⋮ | ⋮ | ⋮ |
| V | UNIFORM,a,b,c | min,max |
| T | UNIFORM,d,e,f | min,max |

FIG.22

| PVT CORNER SETTING ITEM | DISTRIBUTION DATA OF RANDOM NUMBER GENERATION |
|---|---|
| Leff | GAUSS, $\mu_{11}, \sigma_{11}$ |
| Vth | GAUSS, $\mu_{12}, \sigma_{12}$ |
| Tox | GAUSS, $\mu_{13}, \sigma_{13}$ |
| PolyCD | GAUSS, $\mu_{14}, \sigma_{14}$ |
| rshncd | GAUSS, $\mu_{15}, \sigma_{15}$ |
| rshpcd | GAUSS, $\mu_{16}, \sigma_{16}$ |
| ⋮ | ⋮ |
| V | UNIFORM,a,b,c |
| T | UNIFORM,d,e,f |

| CIRCUIT CONFIGURATION | DESIGN VARIABLE 1 | DESIGN VARIABLE 2 | ... | PVT CORNER SETTING ITEM 1 | PVT CORNER SETTING ITEM 2 | ... | PERFORMANCE ITEM 1 | PERFORMANCE ITEM 2 | PERFORMANCE ITEM 3 | ... |
|---|---|---|---|---|---|---|---|---|---|---|
| CIRCUIT1 | ZA1 | ZB1 | | PVT11 | PVT21 | | A1 | B1 | C1 | |

FIG.29

| CIRCUIT CONFIGURATION | DESIGN VARIABLE 1 | DESIGN VARIABLE 2 | ... | PVT CORNER SETTING ITEM 1 | PVT CORNER SETTING ITEM 2 | ... | PERFORMANCE ITEM 1 | PERFORMANCE ITEM 2 | PERFORMANCE ITEM 3 | ... |
|---|---|---|---|---|---|---|---|---|---|---|
| CIRCUIT 1 | ZA1 | ZB1 | | PVT11 | PVT21 | | A1 | B1 | C1 | |
| CIRCUIT 1 | ZA2 | ZB2 | | PVT12 | PVT22 | | A2 | B2 | C2 | |
| CIRCUIT 2 | ZA9 | ZB9 | ... | PVT19 | PVT29 | ... | A9 | B9 | C9 | |
| CIRCUIT 2 | ZA10 | ZB10 | | PVT20 | PVT30 | | A10 | B10 | C10 | |
| ... | | | | | | | | | ... | |

FIG.32

| CIRCUIT CONFIGURATION | DESIGN VARIABLE 1 | DESIGN VARIABLE 2 | ... | PVT CORNER SETTING ITEM 1 | PVT CORNER SETTING ITEM 2 | ... | PERFORMANCE ITEM 1 | PERFORMANCE ITEM 2 | PERFORMANCE ITEM 3 | ... |
|---|---|---|---|---|---|---|---|---|---|---|
| CIRCUIT 1 | ZA1 | ZB1 | | PVT11 | PVT21 | | A1 | B1 | C1 | |
| CIRCUIT 1 | ZA2 | ZB2 | | PVT12 | PVT22 | | A2 | B2 | C2 | |
| CIRCUIT 1 | ZA3 | ZB3 | | PVT13 | PVT23 | | A3 | B3 | C3 | |
| CIRCUIT 1 | ZA4 | ZB4 | | PVT14 | PVT24 | | A4 | B4 | C4 | |
| CIRCUIT 1 | ZA5 | ZB5 | | PVT15 | PVT25 | | A5 | B5 | C5 | |
| ... | ... | ... | ... | ... | ... | ... | ... | ... | ... | ... |
| CIRCUIT 2 | ZA6 | ZB6 | | PVT16 | PVT26 | | A6 | B6 | C6 | |
| CIRCUIT 2 | ZA7 | ZB7 | | PVT17 | PVT27 | | A7 | B7 | C7 | |
| CIRCUIT 2 | ZA8 | ZB8 | | PVT18 | PVT28 | | A8 | B8 | C8 | |
| CIRCUIT 2 | ZA9 | ZB9 | | PVT19 | PVT29 | | A9 | B9 | C9 | |
| CIRCUIT 2 | ZA10 | ZB10 | | PVT20 | PVT30 | | A10 | B10 | C10 | |
| ... | ... | ... | ... | ... | ... | ... | ... | ... | ... | ... |

AUTOMATIC CIRCUIT DESIGN APPARATUS AND METHOD

CROSS-REFERENCE TO RELATED APPLICATIONS

This application is based upon and claims the benefit of priority of the prior Japanese Patent Application No. 2008-248755, filed on Sep. 26, 2008, and the Japanese Patent Application No. 2009-120305, filed on May 18, 2009, the entire contents of which are incorporated herein by reference.

FIELD

This technique relates to an automatic circuit design technique.

BACKGROUND

An optimization processing means for optimizing constants of analogue circuits so as to satisfy given characteristic specification and design conditions has already existed. Specifically, a method is known that one objective function is constructed by summing plural weighted objective functions, and a combination of circuit constants which cause a value of the objective function to be minimized is searched by the simplex method. In this search processing, the optimization of the circuit constants is carried out so as to satisfy the requirement specification while changing the circuit configuration. However, when it is recognized that the requirement specification cannot be satisfied, it is necessary to repeat the same processing after returning to the first step and changing the requirement specification.

Because the circuit simulation should be repeated in the aforementioned search processing, it takes long time. If it is recognized that the requirement specification cannot be satisfied and the requirement specification is changed after returning to the first step, it takes further long time because the circuit simulation is further repeated. Thus, the conventional technique cannot substantially carry out the change of the requirement specification a lot of times.

Namely, the conventional technique cannot automatically design circuits close to the requirement specification in a short time regardless of a case where the requirement specification is satisfied or a case where the requirement specification is not satisfied.

SUMMARY

According to an aspect of this technique, an automatic circuit design method includes (A) extracting circuit configurations having possibility that requirement specification is satisfied, from a circuit configuration data storage device storing data of the circuit configurations; (B) for each of the extracted circuit configurations, obtaining a plurality of simulation results for respective items in the requirement specification by circuit simulation while changing a value of each design variable for the circuit configuration so as to satisfy constraint conditions of the circuit configuration, extracting a set of pareto optimal solutions that are non-dominated solutions in a solution specification space for the respective items in the requirement specification, from the simulation results, and storing respective pertinent values of the design variables and pertinent values of the respective items in the requirement specification for each of the pareto optimal solutions into an individual circuit configuration pareto data storage device in association with the extracted circuit configuration; (C) extracting second pareto optimal solutions that are non-dominated solutions among all of the pareto optimal solutions, which are stored in the individual circuit configuration pareto data storage device, for all of the extracted circuit configurations, and storing, for each of the extracted second pareto optimal solutions, an identifier of the pertinent circuit configuration, the respective pertinent values of the design variables and the pertinent values of the respective items in the requirement specification into an entire pareto data storage device; (D) calculating, as a provisional optimal solution, a point whose distance from a point corresponding to the requirement specification after space conversion of the solution specification space to balance value distribution for the items in the requirement specification, is shortest and which is on a pareto curve of the second pareto optimal solutions after the space conversion is carried out for the second pareto optimal solutions stored in the entire pareto data storage device, in the solution specification space after the space conversion; (E) extracting a pareto optimal solution close to the provisional optimal solution in the solution specification space after the space conversion, from the second pareto optimal solutions after the space conversion is carried out for the second pareto optimal solutions stored in the entire pareto data storage device, and identifying circuit configuration for the provisional optimal solution from the extracted pareto optimal solution close to the provisional optimal solution; (F) mapping the provisional optimal solution to values of the respective design variables in the identified circuit configuration; and (G) outputting the identifier of the identified circuit configuration and the values of the respective design variables in the identified circuit configuration, which are obtained by the mapping.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 9 is a diagram depicting an example of data stored in an individual pareto data storage;

FIG. 15 is a diagram depicting an example of data stored in an entire pareto data storage;

FIG. 21 is a diagram depicting an example of data stored in a PVT corner setting data storage;

FIG. 22 is a diagram depicting an example of data stored in a PVT corner setting data storage;

FIG. 29 is a diagram depicting an example of data generated;

FIG. 31 is a diagram depicting an example of data stored in the individual pareto data storage in the second embodiment;

FIG. 32 is a diagram depicting an example of data stored in the entire pareto data storage in the second embodiment.

DESCRIPTION OF EMBODIMENTS

[First Embodiment]

Figure 1:
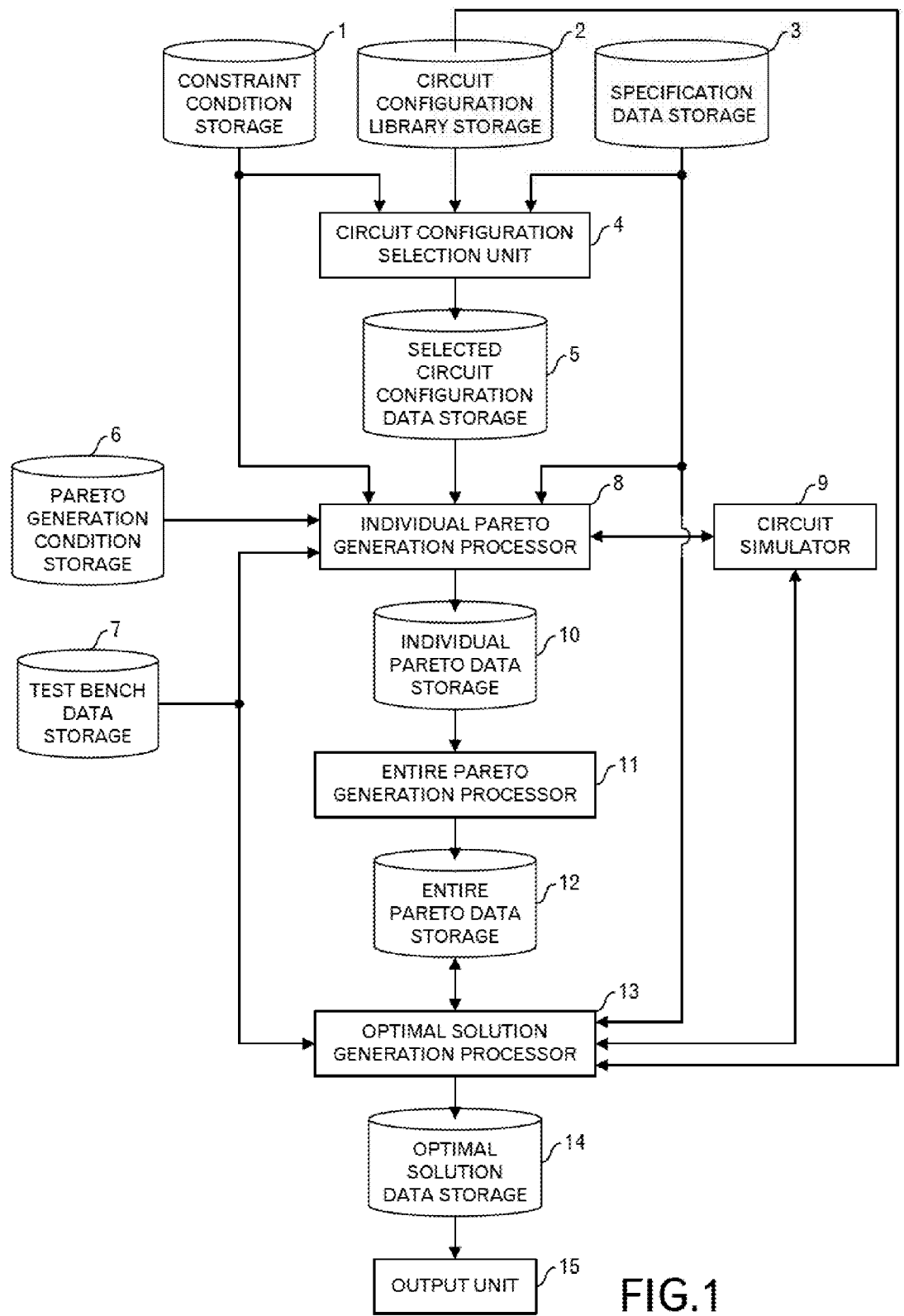
FIG. 1 is a functional block diagram of an automatic circuit design apparatus in a first embodiment of this technique.

FIG. 1 depicts a functional block diagram of an automatic circuit design apparatus relating to a first embodiment of this technique. This automatic circuit design apparatus has (a) a circuit configuration library storage 2 storing circuit configuration data of analogue circuits, which has been designed but whose circuit parameters are not defined; (b) a constraint condition storage 1 storing constraint conditions for the respective circuit configurations; (c) a specification data storage 3 storing specification data of requirement specification designated by the user; (d) a circuit configuration selection unit 4, which selects the circuit configurations having possibility that the requirement specification is satisfied, by using data stored in the constraint condition storage 1, the circuit configuration library storage 2 and the specification data storage 3; (e) a selected circuit configuration data storage 5 storing data for the circuit configuration selected by the circuit configuration selection unit 4; (f) a pareto generation condition storage 6 storing pareto generation conditions; a test bench data storage 7 storing data for peripheral circuits used for the simulation for each type of the circuit configuration, for instance; (h) a circuit simulator 9 such as Simulation Program with Integrated Circuit Emphasis (SPICE); (i) an individual pareto generation processor 8 to cooperate with the circuit simulator 9 and to generate pareto optimal solutions (hereinafter, may be called pareto. The pareto optimal solution will be explained later.) for each of the selected circuit configurations by using data stored in the constraint condition storage 1, the selected circuit configuration data storage 5, the specification data storage 3, the pareto generation condition storage 6 and the test bench data storage 7; (j) an individual pareto data storage 10 storing processing results of the individual pareto generation processor 8; (k) an entire pareto generation processor 11 to generate paretos in all of the selected circuit configurations by using data stored in the individual pareto data storage 10; (l) an entire pareto data storage 12 storing processing results by the entire pareto generation processor 3; (m) an optimal solution generation processor 13 that carries out a processing to identify the optimal circuit configuration and values of the respective parameters in the optimal circuit configuration by using data stored in the test bench data storage 7, the specification data storage 3, the entire pareto data storage 12 and the circuit configuration library storage 2; (n) an optimal solution data storage 14 storing processing results by the optimal solution generation processor 13; and (o) an output unit 15 to output data stored in the optimal solution data storage 14 to the user through an output device such as a display device or a printer. The optimal solution generation processor 13 also cooperates with the circuit simulator 9. In addition, the circuit simulator 9 may be implemented as an apparatus other than the automatic circuit design apparatus.

Figure 2:
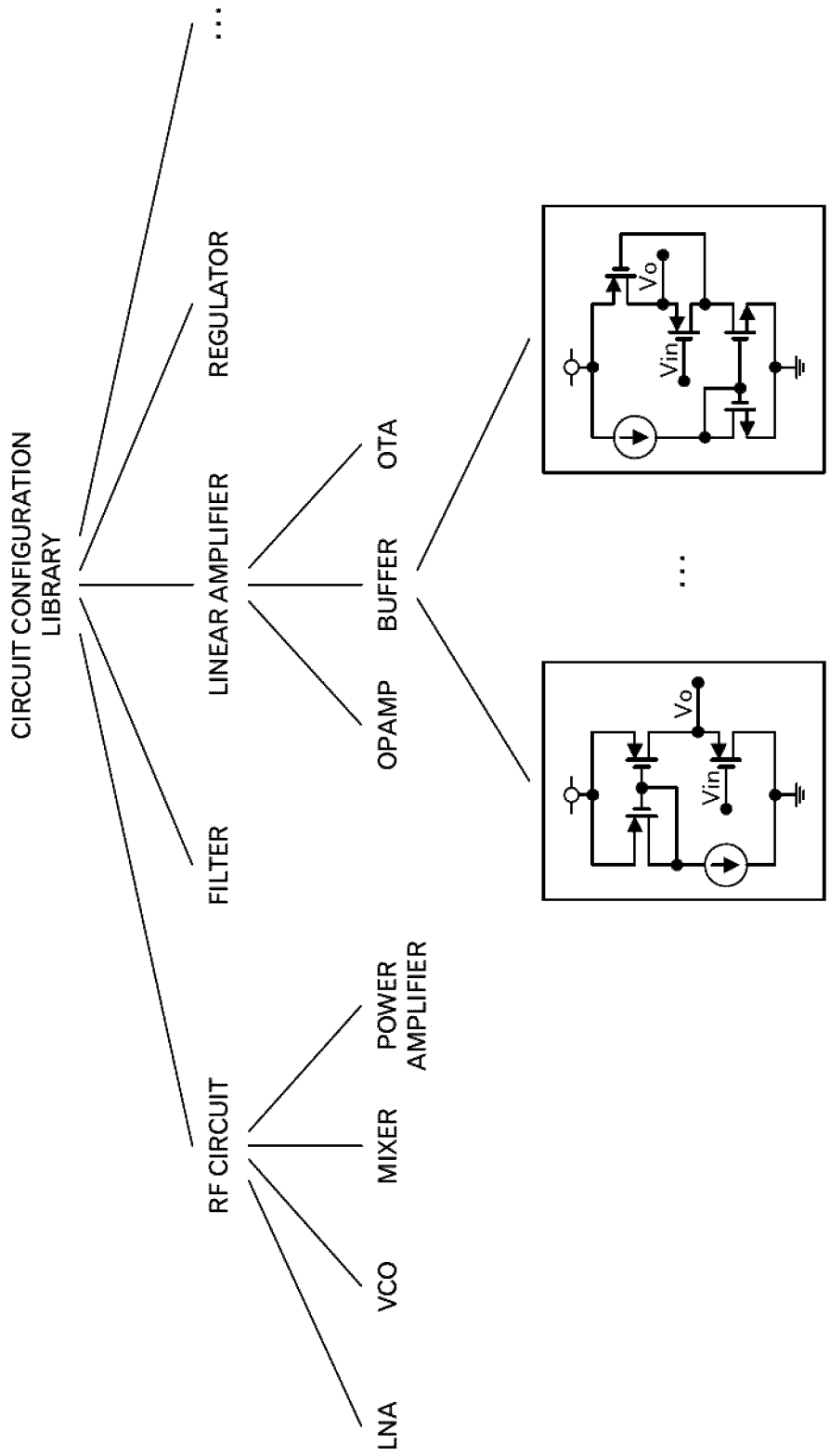
FIG. 2 is a diagram depicting an example of data stored in a circuit configuration library storage.

The circuit configuration library storage 2 stores circuit configurations in data structure as depicted in FIG. 2, for example. Namely, a tag representing characteristics and function of the circuit configuration is attached to each of the circuit configurations to construct a layer type of data structure depicted in FIG. 2. Therefore, a search for the circuit configurations having specific characteristics and function can be conducted. In an example of FIG. 2, functions are categorized, in the first layer, into, for example, an RF circuit, a filter, a linear amplifier, a regulator and the like. The second layer of the RF circuit includes a Low Noise Amplifier (LNA), a Voltage Controlled Oscillator (VCO), a mixer, a power amplifier and the like, and the second layer of the linear amplifier includes an operational amplifier (OPAMP), a buffer, an Operational Transconductance Amplifier (OTA) and the like. FIG. 2 schematically depicts that two different circuit configurations are registered for the buffer.

Figures 3, 4, 6:
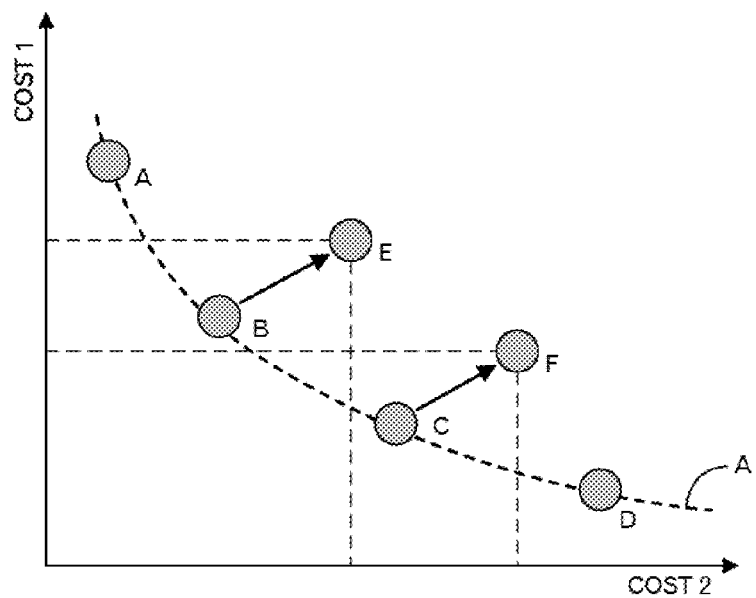
FIG. 3 is a diagram depicting an example of data stored in a constraint condition storage.
FIG. 4 is a diagram depicting an example of data stored in a specification data storage.
FIG. 6 is a schematic diagram to explain pareto.

In addition, the constraint condition storage 1 stores data as depicted, for example, in FIG. 3 for each circuit configuration. As depicted in FIG. 3, the constraint condition includes a direct constraint condition and an indirect constraint condition. The direct constraint condition includes a constraint condition by manufacturing conditions (a process, a design rule (the gate length L, gate width W and the like), a constraint condition (a matching condition, size proportional condition, and constraint condition between parameters) by the circuit operation principle and a constraint condition (an operational voltage, temperature and input condition) by a system requirement. The indirect constraint condition is a condition representing a limitation from the mandatory performance to the circuit configuration parameters. In an example of FIG. 3, a condition for an area is defined. In addition to these conditions, constraint conditions such as a consumed power, Total Harmonic Distortion (THD), DC gain, and bandwidth may be defined. The constraint conditions are conditions for design variables that the designer can designate. As depicted in FIG. 3, a value range such as 65 nm to 2 μm of the gate length L may be designated.

Furthermore, FIG. 4 depicts an example of data stored in the specification data storage 3. The requirement specification defines a characteristic value to be satisfied in the entire circuit, for each item, and a value is defined for each item such as the consumed electric current, THD, DC gain and the bandwidth in the example of FIG. 4. Other items may be adopted. The value of the item is defined according to the design object. Incidentally, in this embodiment, the specification data storage 3 also stores data indicating what type of function and characteristics are required for the circuit (e.g. a buffer) to be designed.

Figure 5:
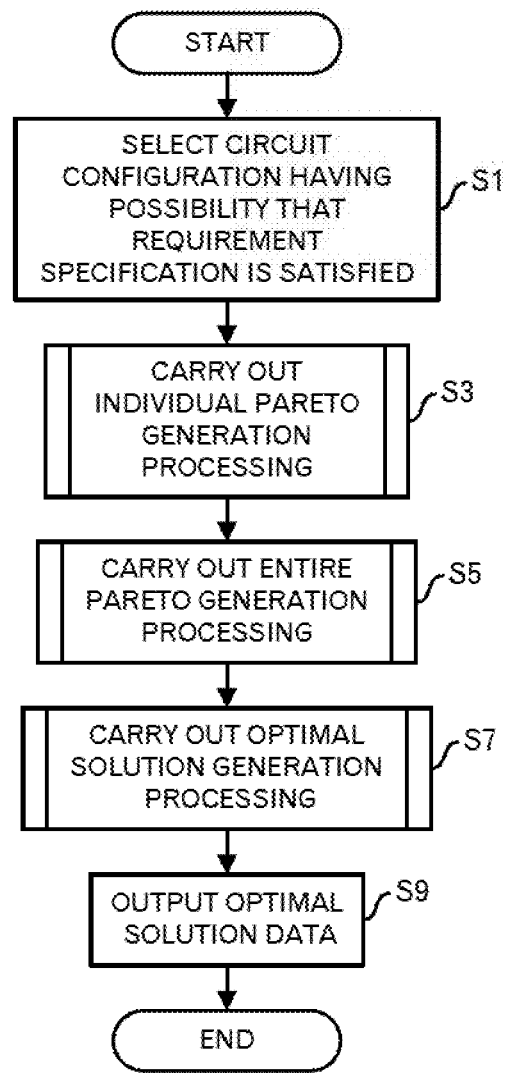
FIG. 5 is a diagram depicting a main processing flow in the embodiment of this technique.

Next, an operation of the automatic circuit design apparatus will be explained by using FIGS. 5 to 19. First, the circuit configuration selection unit 4 selects, from the circuit configuration library storage 2, the circuit configurations having possibility that the requirement specification stored in the specification data storage 3 is satisfied and also having the designated characteristics and function (FIG. 5: step S1). As described above, the constraint conditions for each circuit configuration are stored in the constraint condition storage 1, and the circuit configuration, for which the constraint condition is defined that does not apparently satisfy the value for each item in the requirement specification, is excluded as a circuit configuration having no possibility that the requirement specification is satisfied. The circuit configuration selection unit 4 stores data for the selected circuit configurations into the selected circuit configuration data storage 5.

Next, the individual pareto generation processor 13 carries out an individual pareto generation processing (step S3). This individual pareto generation processing will be explained by using FIGS. 6 to 10.

First, the pareto will be explained by using FIG. 6. Here, it is presupposed that only two items exist in the requirement specification, that the first item is defined as "cost1" for the vertical axis and the lesser the value is, the lower the cost is, and that the second item is defined as "cost2" for the horizontal axis and the lesser the value is, the lower the cost is. Then, when the circuit simulation is carried out by using a specific set of circuit parameters to obtain values of the cost1 and cost2, it is possible to plot points on a two-dimensional space (called "solution space" or "solution specification space") as depicted in FIG. 6. In an example of FIG. 6, 6 points A to F (hereinafter, also called "solution") have been obtained. In such a situation, because the lesser value is naturally preferable for the cost1 and cost2, the closer to the origin the solution is, the better the solution is. Then, "X dominates Y" means all component values (i.e. cost) of Y are inferior to all corresponding component values of X. In the two-dimensional space as depicted in FIG. 6, because both values of the cost1 and cost2 of "B" are lesser than those of "E" and "B" is a better solution than "E", it can be said "B dominates E", and because "C" is a better solution than "F", it can be said "C dominates F". On the other hand, when "A" is compared with "B", it cannot be said "A dominates B", because the value of the cost2 of "A" is lesser than that of "B" but the value of the cost1 of "B" is lesser than that of "A". Thus, the dominance relation is not valid for "A" to "D". The non-dominated solution that is a solution not dominated by other solutions in the solution space is called "a pareto optimal solution". Then, a curve A (a curved surface in the n-dimensional space ("n" is equal to or greater than "3") connecting the pareto optimal solutions is called "a pareto curve" (or "a pareto curved surface").

Figure 7:
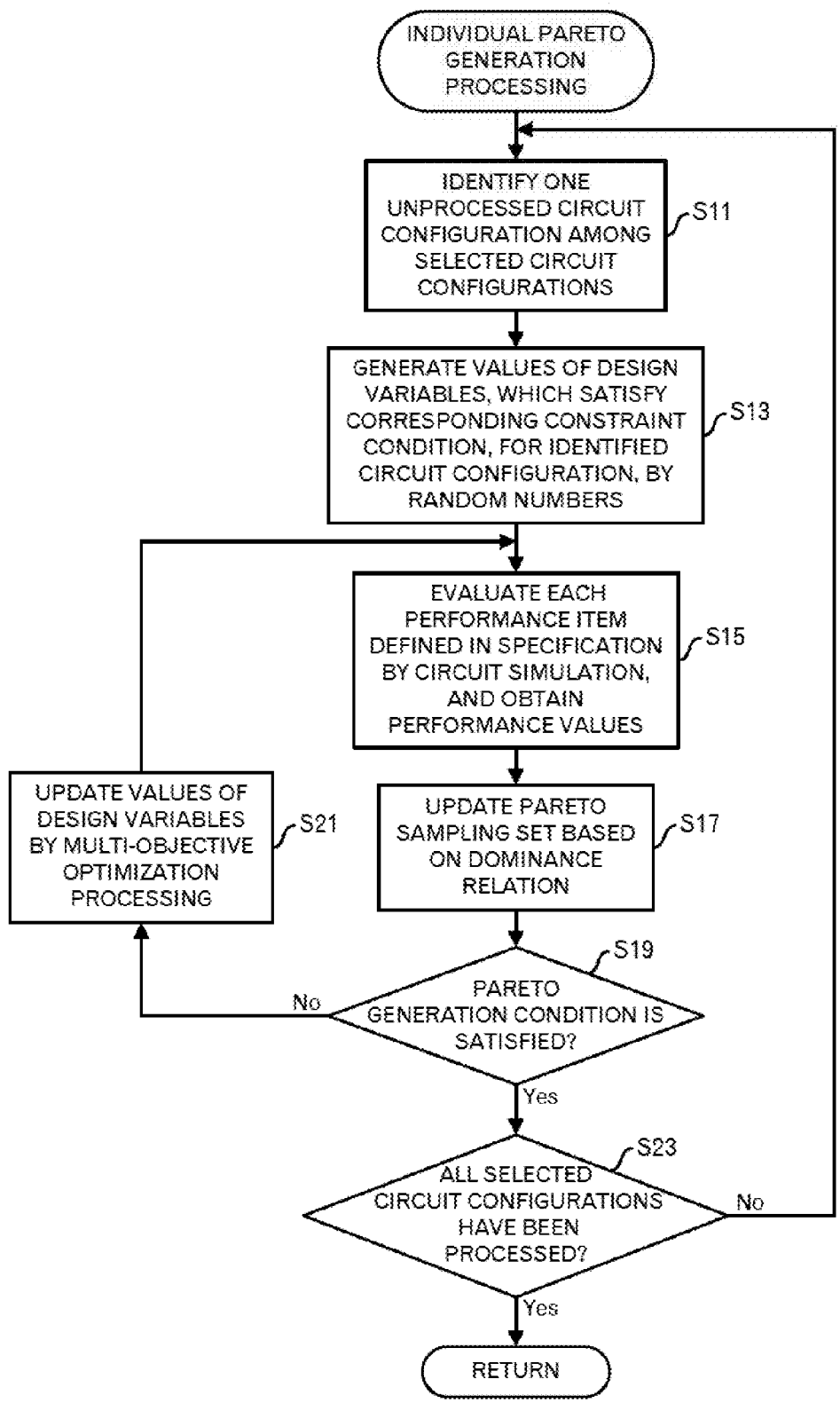
FIG. 7 is a diagram depicting a processing flow of an individual pareto generation processing.

Under such a presupposition, the individual pareto generation processing will be explained according to FIG. 7. First, the individual pareto generation processor 8 identifies one unprocessed circuit configuration among the selected circuit configurations stored in the selected circuit configuration data storage (step S11). Then, the individual pareto generation processor 8 generates, for the identified circuit configuration, values of the design variables (i.e. circuit parameters including, for example, the gate length L and gate width W), which satisfy the corresponding constraint conditions for the identified circuit configuration, which are stored in the constraint condition storage 1, by using the random numbers, and stores the values into a storage device such as a main memory (step S13). Then, the individual pareto generation processor 8 reads out data of the peripheral circuits required for the circuit simulation for the identified circuit configuration from the test bench data storage 7, outputs the read data of the peripheral circuits, data of the identified circuit configuration, which is stored in the selected circuit configuration data storage 5, the generated values of the design variables and the respective items (i.e. performance items) in the requirement specification, which are stored in the specification data storage 3, to the circuit simulator 9, causes the circuit simulator 9 to evaluate the respective performance items defined in the requirement specification, obtains performance values of the respective performance items defined in the requirement specification from the circuit simulator 9, and stores the obtained values into the storage device such as the main memory (step S15).

Figure 8:
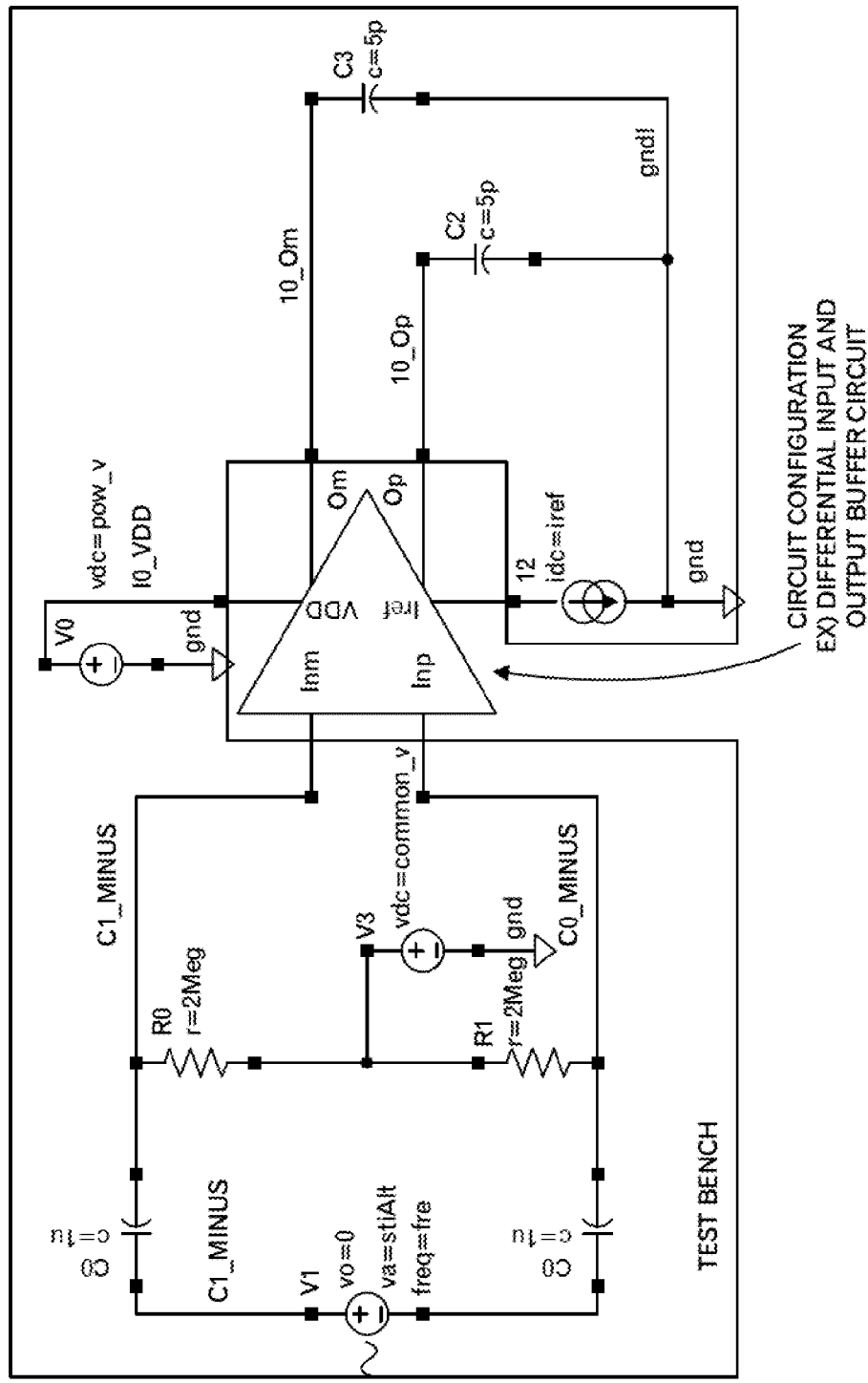
FIG. 8 is a diagram schematically depicting data stored in a test bench data storage.

FIG. 8 depicts an example of data of the peripheral circuit, which is read out from the test bench data storage 7. In the example of FIG. 8, a differential input and output buffer circuit, which is the identified circuit configuration, is depicted in the center, and circuits required for the measurements of the performance items and a power supply circuit are connected to a power supply terminal, input and output terminals and the like for the differential input and output buffer circuit. Such peripheral circuits are well-known, and further explanation is omitted.

In addition, processing contents of the circuit simulation is also well-known, and further explanation is omitted.

After that, the individual pareto generation processor 8 judges, by confirming the dominance relation with the respective pareto optimal solutions selected prior to this step, whether or not a set of performance values for the respective performance items, which are obtained at the step S15, constitutes a pareto optimal solution in the solution space, and updates a pareto sampling set based on the judgment result (step S17). Namely, when a solution constituted by the set of performance values for the respective performance items, which are obtained at the step S15, dominates another solution, the individual pareto generation processor 8 excludes another solution from the pareto sampling set that is a set of the pareto optimal solutions, adds the solution obtained at the step S15 to the pareto sampling set. On the other hand, when the solution obtained at the step S15 is dominated by another solution, the solution obtained at the step S15 is discarded.

The pareto sampling set is stored into the individual pareto data storage 10 as data as depicted in FIG. 9. In an example of FIG. 9, a table stores an identifier of the circuit configuration, values of the design values 1 to 3 and values of the performance items 1 to 4. The number of variables and the number of items are mere examples, and may be greater than those in FIG. 9. Thus, data for one pareto optimal solution is registered as one record. Then, records for one circuit configuration constitute the pareto sampling set. In addition, the data of the circuit configuration is also stored into the individual pareto data storage 10 in this embodiment.

After that, the individual pareto generation processor 8 judges whether or not the pareto generation conditions stored in the pareto generation condition storage 6 are satisfied (step S19). The pareto generation conditions are execution conditions in the multi-objective optimization processing method (i.e. a method for simultaneously investigating tradeoff among plural objective functions), and when the genetic multi-objective optimization algorithm NSGA-II (Non-dominate Sorting Genetic Algorithm II) is used, the number of generations that a population evolves, the population and the like are designated as the pareto generation condition. Incidentally, the multi-objective optimization itself, especially NSGA-II, is well-known, and various documents are disclosed.

When the pareto generation conditions are not satisfied, the individual pareto generation processor 8 updates the values of the design variables by the aforementioned well-known multi-objective optimization processing (e.g. a crossover processing or mutation processing) and stores the updated values into the storage device such as the main memory (step S21). Then, the processing returns to the step S15.

On the other hand, when the pareto generation conditions are satisfied, the individual pareto generation processor 8 judges whether or not all of the selected circuit configurations have been processed (step S23). When at least one unprocessed selected circuit configuration exists, the processing returns to the step S11. On the other hand, when no unprocessed selected circuit configuration exists, the processing returns to the calling-source processing.

Figure 10:
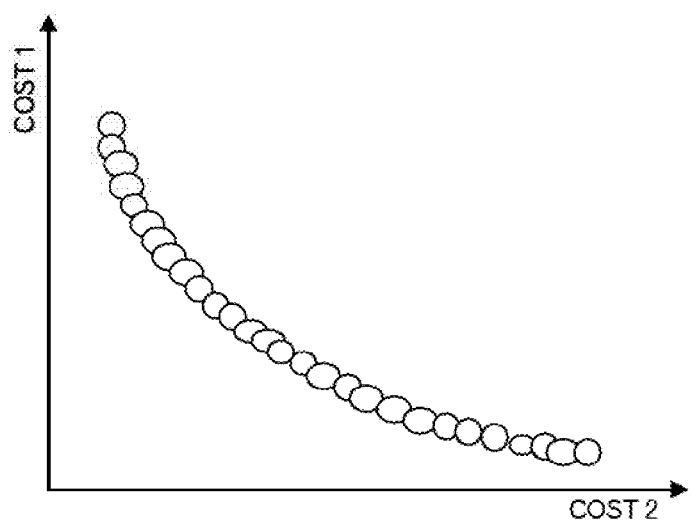
FIG. 10 is a diagram schematically depicting a pareto sampling set.

By carrying out such a processing, a set of pareto optimal solutions is generated for each selected circuit configuration. When schematically depicting the solution space as the two-dimensional space, plural solutions constituting the pareto curve as depicted in FIG. 10 are obtained.

Returning to the explanation of the processing in FIG. 5, the entire pareto generation processor 11 carries out an entire pareto generation processing (step S5). This entire pareto generation processing will be explained by using FIGS. 11-15.

Incidentally, the entire pareto generation processing is a processing to superpose the pareto sampling sets for the respective selected circuit configurations to constitute a set of pareto optimal solutions for the entire selected circuit configurations. Thus, either of two methods may be adopted, one is a method for confirming the mutual dominance relations for all solutions included in the respective selected circuit configurations and discretely generating a set of pareto optimal solutions for the entire selected circuit configurations, and the other is a method for identifying the pareto optimal solutions for the entire selected circuit configurations by modeling the pareto sampling sets for the respective selected circuit configurations by the mathematical expressions and mathematically analyzing the dominance relation between the mathematical expressions.

Here, the former will be explained. First, the entire pareto generation processor 11 sets the entire pareto sampling set PL=$\phi$ (step S31). The set PL is stored in the entire pareto data storage 12. Then, the entire pareto generation processor 11 identifies one unprocessed pareto optimal solution p among the pareto optimal solutions for all of the selected circuit configurations (step S33). After that, the entire pareto generation processor 11 adds the pareto optimal solution p to the set PL (step S35).

Furthermore, the entire pareto generation processor 11 identifies one unprocessed optimal solution pb different from p among the set PL (step S37). Then, the entire pareto generation processor 11 judges whether or not "pb dominates p" is satisfied (step S39). When "pb dominates p" is satisfied, the entire pareto generation processor 11 removes p from the set PL, because p dose not constitute the pareto optimal solution for all of the selected circuit configurations (step S41). Then, the processing shifts to step S49. On the other hand, "pb dominates p" is not satisfied, the entire pareto generation processor 11 judges whether or not "p dominates pb" is satisfied (step S43). When "p dominates pb" is satisfied, the entire pareto generation processor 11 removes pb from the set PL, because pb is unnecessary (step S45). Then, the processing shifts to step S47. Also in case where "p dominates pb" is not satisfied, the processing shifts to the step S47.

Figure 12:
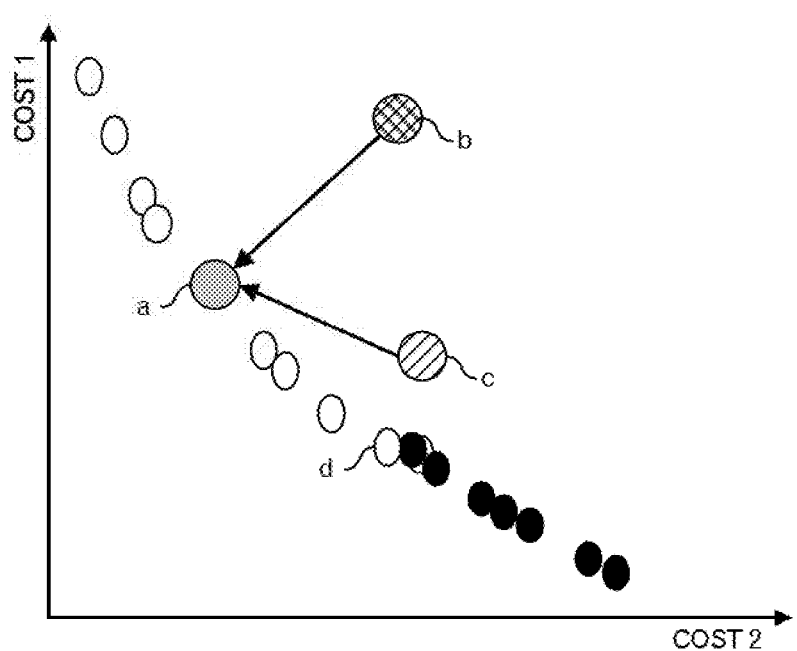
FIG. 12 is a schematic diagram to explain the entire pareto generation processing.

As depicted in FIG. 12, when p corresponds to "a" in FIG. 12 and pb corresponds to "b" in FIG. 12, "a dominates b" is satisfied. Therefore, "b" in FIG. 12 is removed from the set PL. On the other hand, when pb corresponds to "c", "a dominates c" is not satisfied. Therefore, "c" remains in the set PL. However, for example, when p corresponds "d" in FIG. 12, "d dominates c" is satisfied. Therefore, "c" is removed from the set PL. Basically, even when p corresponds to "b" and pb corresponds to "a", the similar operation is carried out.

After that, the entire pareto generation processor 11 judges whether or not all of the pareto optimal solutions in the set PL have been processed (step S47). When all of the pareto optimal solutions in the set PL have not been processed, the processing returns to the step S37. On the other hand, when all of the pareto optimal solutions in the set PL have been processed, the entire pareto generation processor 11 judges whether or not all of the pareto optimal solutions for all of the selected circuit configurations have been processed (step S49). When at least one unprocessed pareto optimal solution for all of the selected circuit configurations exists, the processing returns to the step S33. When all of the pareto optimal solutions have been processed, the processing returns to the calling-source processing.

Figure 11:
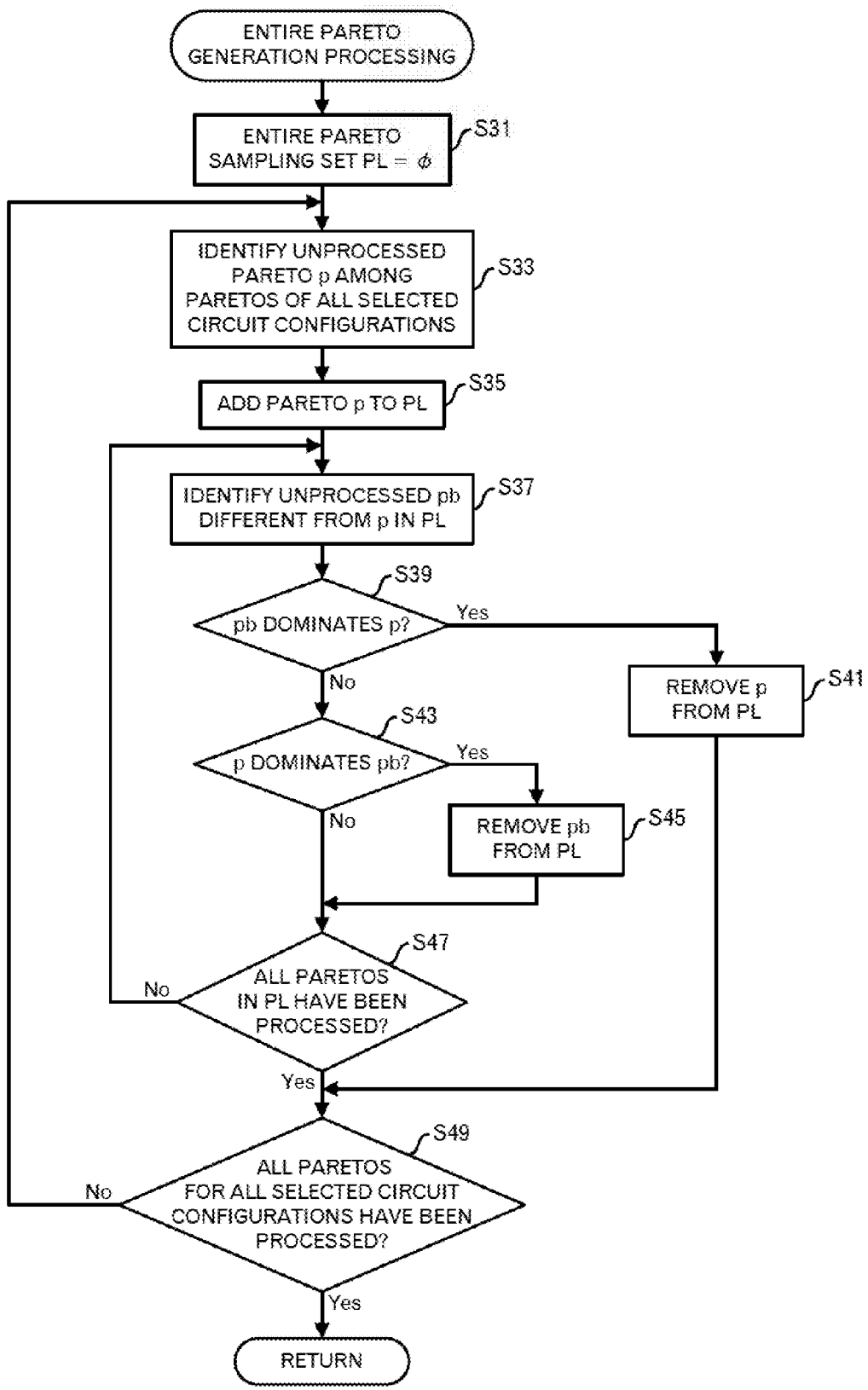
FIG. 11 is a diagram depicting a processing flow of an entire pareto generation processing.
Figure 13:
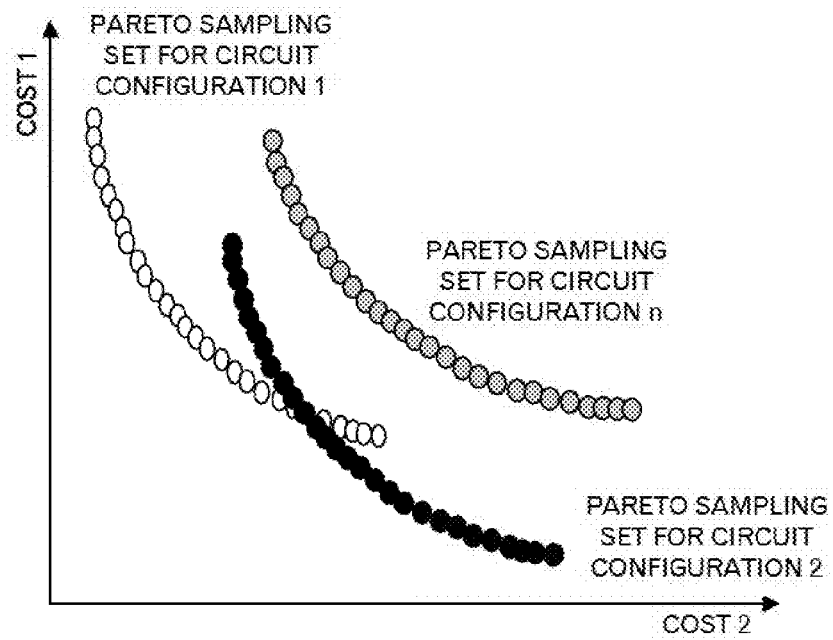
FIG. 13 is a schematic diagram to explain the entire pareto generation processing.
Figure 14:
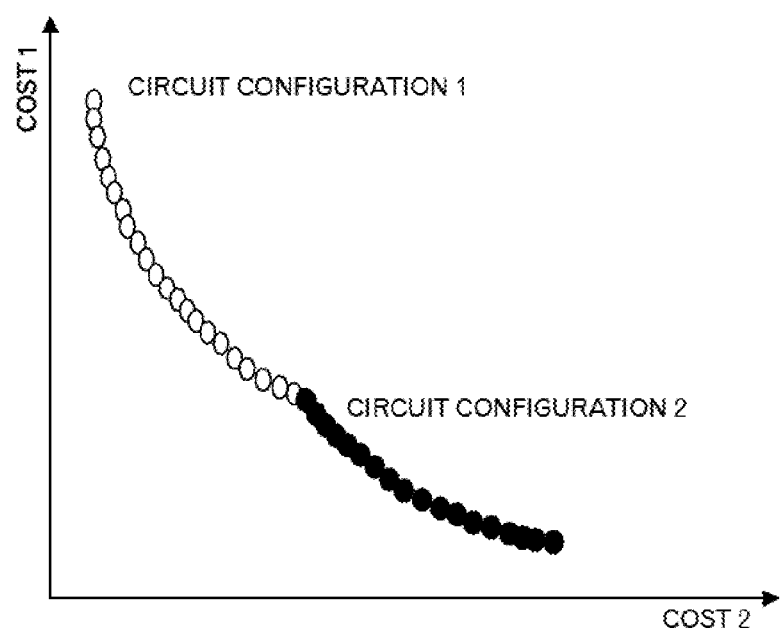
FIG. 14 is a schematic diagram to explain the entire pareto generation processing.
Figure 16:
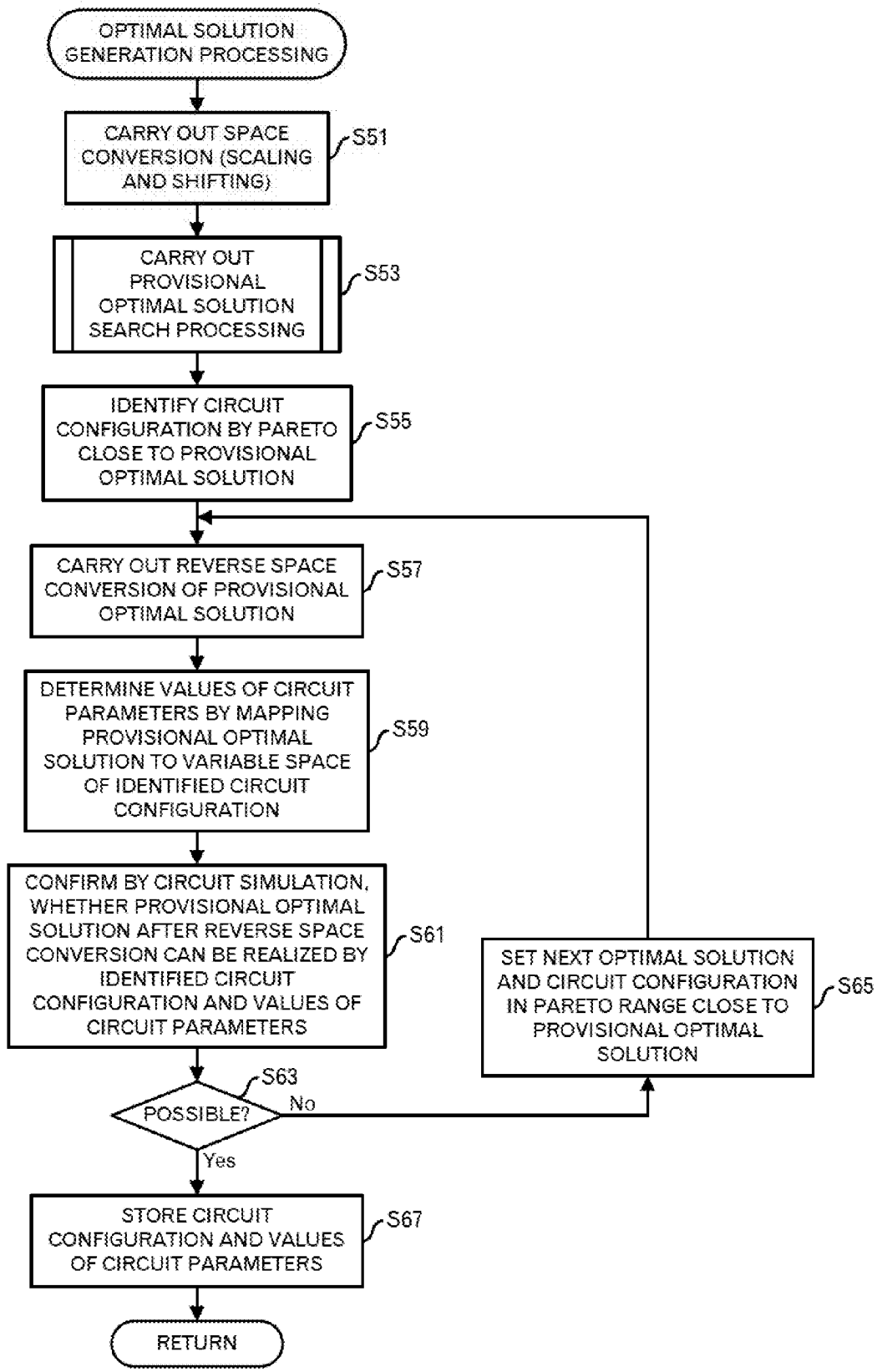
FIG. 16 is a diagram depicting a processing flow of an optimal solution generation processing.

For example, as depicted in FIG. 13, the two-dimensional space is presupposed for the solution space, and when there are a pareto sampling set for the circuit configuration 1, a pareto sampling set for the circuit configuration 2 and a pareto sampling set for the circuit configuration n, non-dominated solutions are remained by carrying out the processing depicted in FIG. 11. Then, as depicted in FIG. 14, a portion of the pareto optimal solutions for the circuit configuration 1 and a portion of the pareto optimal solutions for the circuit configuration 2 constitute the pareto sampling set for all of the selected circuit configurations.

In addition, the entire pareto data storage 12 stores data as depicted in FIG. 15. Only records corresponding to the pareto optimal solutions for all of the selected circuit configurations are included in FIG. 15 among the records as depicted in FIG. 9. Namely, one record includes the identifier of the circuit configuration, the values of the design variables 1 to 3 and the values of the performance items 1 to 4. Incidentally, data of the pertinent circuit configurations is also stored into the entire pareto data storage 12.

Returning to the explanation of the processing in FIG. 5, the optimal solution generation processor 13 carries out an optimal solution generation processing (step S7). This optimal solution generation processing will be explained by using FIGS. 16-19.

First, the optimal solution generation processor 13 carries out a space conversion (i.e. scaling and shifting) of the solution space so as to balance distribution of the values of the respective items in the requirement specification (step S51). The processing results are stored, for example, into the entire pareto data storage 12. The data format is the same as the portion including the identifier of the circuit configuration and the performance items 1 to 3 in FIG. 15, for example.

For example, the distance between the requirement specification S and the pareto optimal solution P in the solution space is defined as follows:

$$\|S-P\| = \sqrt{(S_1-P_1)^2 + (S_2-P_2)^2 + \ldots + (S_n-P_n)^2} \quad (1)$$

In such a case, for example, when the consumed electric current as one of the performance items is about several micro A and the bandwidth as one of the performance items is about several GHz, the value of the consumed electric current is apparently smaller than the value of the bandwidth. Therefore, the consumed electric current is substantially ignored. In order to avoid such a situation and cause all of the performance items to be equivalently treated, the space conversion is required. Specifically, the Affine conversion as described below is carries out. Incidentally, $P_{Tran}$ represents a solution vector after the space conversion, $P_{samp}$ represents a solution vector (having n components. "n" is the number of performance items.) before the space conversion, $V_{shift}$ represents a vector (having n components) for the parallel displacement, and $M_{scaling}$ represents a diagonal matrix (i.e. a matrix having n rows and n columns) to increase or decrease the values of the respective performance items in $P_{samp}$.

$$P_{Tran} = V_{shift} + M_{scaling} * P_{samp}$$

$$M_{scaling\_(i,j)} = \begin{cases} c_{i0}/(\max(obj_i) - \min(obj_i)) & (i=j) \\ 0 & (i \neq j) \end{cases}$$

Incidentally, $M_{scaling\_(i,j)}$ represents a component at i-th row and j-th column of $M_{scaling}$. In addition, $\max(obj_i)$ means the maximum value of the i-th performance item among all of the pareto optimal solutions stored in the entire pareto data storage 12 (depending on the situation, the individual pareto data storage 10), and $\min(obj_i)$ means the minimum value of the i-th performance item among all of the pareto optimal solutions stored in the entire pareto data storage 12, similarly. Furthermore, $V_{shift\_i}$ represents the i-th component of $V_{shift}$. In addition, $C_{i0}$ is a constant designated for "i".

By carrying such a conversion, the space conversion so as to balance the respective performance items can be carried out. Namely, the respective performance items are almost equivalently treated.

Incidentally, when the distance is calculated, the same space conversion is required for the requirement specification S, naturally. By replacing $Ps_{amp}$ in the aforementioned expression with "S", the space conversion for the requirement specification S is conducted. The requirement specification after the space conversion is stored into the storage device such as the main memory.

Next, the optimal solution generation processor 13 carries out a provisional optimal solution search processing (step S53). This provisional optimal solution search processing will be explained by using FIG. 17.

Figure 17:
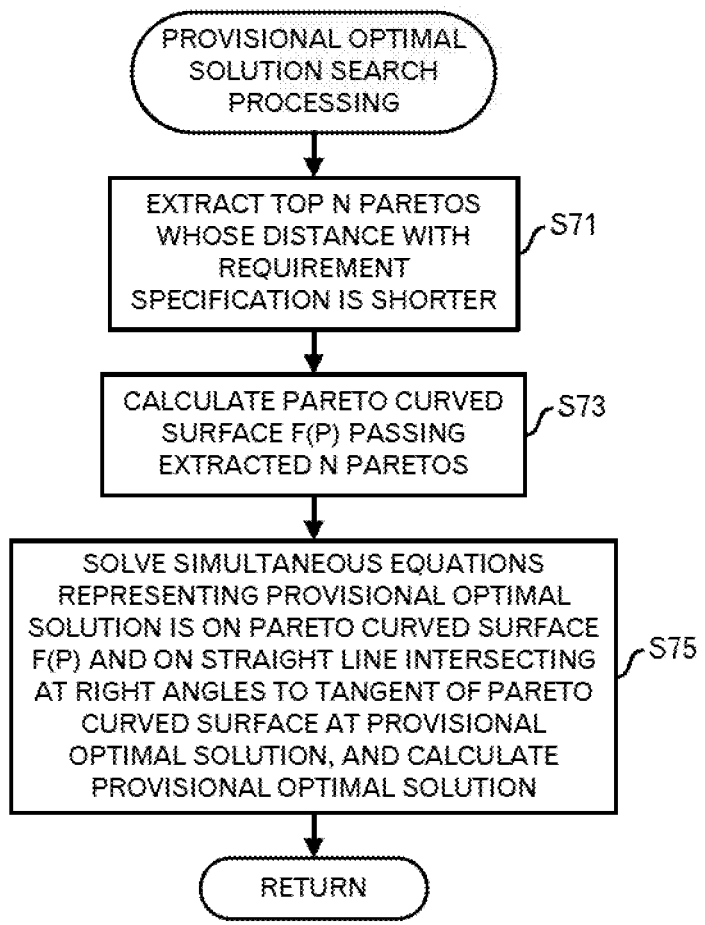
FIG. 17 is a diagram depicting a provisional optimal solution search processing.

First, the optimal solution generation processor 13 extracts top N pareto optimal solutions whose distance with the requirement solution is shorter, from the entire pareto data storage 12 (FIG. 17: step S71). Because the solutions after the space conversion are used, the distance is calculated by using the aforementioned expression (1). Then, the optimal solution generation processor 13 calculates a pareto curved surface F(P)=0 (in case of the two-dimensional space, a pareto curve) passing through the N extracted pareto optimal solutions by using a well-known method such as a method of least squares (step S73).

Then, the optimal solution generation processor 13 calculates the provisional optimal solution by solving simultaneous equations representing that the provisional optimal solution is on the pareto curved surface F(P)=0 and also on a straight line intersecting at right angles to a tangent of the pareto curve at the provisional optimal solution, and stores the provisional optimal solution into the storage device such as the main memory (step S75).

Figure 18:
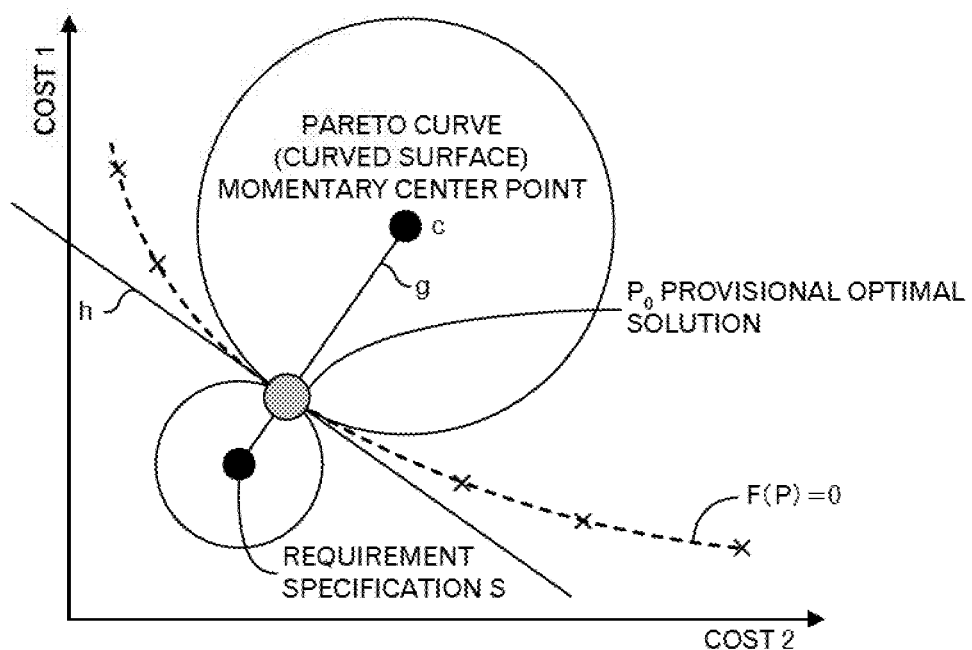
FIG. 18 is a diagram schematically depicting search of a provisional optimal solution.

The outline of this processing will be explained by using FIG. 18. As depicted in FIG. 18, when it is presupposed that a curve passing the N pareto optimal solutions extracted at the step S71 is the pareto curve F(P), the provisional optimal solution $P_0$ is on the pareto curve F(P)=0. Namely, $F(P_0)$=0 is satisfied. Furthermore, according to Collinearity theorem, the requirement specification S, the provisional optimal solution $P_0$ and the momentary center point of the pareto curve (generally, a curved surface) are on the same straight line. Namely, the provisional optimal solution $P_0$ and the requirement specification S are on the straight line g intersecting at right angles to a tangent h of the pareto curved surface at the provisional optimal solution $P_0$.

Specifically, the relations are represented by the following equations.

$$\begin{cases} P_o = -\nabla F(P)|_{P=P_o} \times t + Spec \\ F(P_o) = 0 \end{cases}$$

The first term in the right side of the first equation is a vector representing the straight line g, and "t" is an unknown coefficient, and Spec corresponds to the requirement specification S. Namely, the first expression represents the provisional optimal solution $P_0$ is obtained by multiplying the straight line g from the requirement specification S by "t". When such simultaneous equations are solved, "t" and the provisional optimal solution $P_0$ are obtained. Then, the processing returns to the calling source processing.

Incidentally, possibility that the provisional optimal solution $P_0$ is different from the solutions stored in the entire pareto data storage 12 is high. Therefore, a following confirmation processing is required.

Namely, the optimal solution generation processor 13 extracts the pareto optimal solutions close to the provisional optimal solution from the entire pareto data storage 12, and determines the circuit configuration of the provisional optimal solutions based on the circuit configuration of the close pareto optimal solutions (step S55). Schematically depicting a case of the two dimensional space in FIG. 19, when the provisional optimal solution $P_0$ is obtained from the requirement specification S, the optimal solution generation processor 13 extracts the pareto optimal solutions $P_1$ and $P_2$ close to the provisional optimal solution $P_0$ (here, both sides of the provisional optimal solution on the pareto curve). Then, the optimal solution generation processor 13 identifies identifiers of the circuit configurations stored in the entire pareto data storage 12 in association with the pareto optimal solutions $P_1$ and $P_2$. At this time, when the same identifier is obtained for both of the pareto optimal solutions $P_1$ and $P_2$, this circuit configuration is adopted. On the other hand, when the different identifiers are obtained, the circuit configuration of the pareto optimal solution closest to the provisional pareto optimal solution is adopted.

Then, the optimal solution generation processor 13 carries out a reverse space conversion of the provisional optimal solution (step S57). The reverse conversion of the space conversion carried out at the step S51 is carried out. Specifically, an inverse vector of $V_{shift}$ is subtracted from $P_{Tran}$, and the result is further multiplied by an inverse matrix of $M_{scaling}$ from the left. This is because it is used at step S61.

Then, the optimal solution generation processor 13 determines values of the circuit parameters by mapping the provisional optimal solution to the variable space of the identified circuit configuration, and stores the values into the storage device such as the main memory (step S59).

Specifically, the optimal solution generation processor 13 selects the N pareto optimal solutions near the requirement specification, and calculates a relational expression f of the circuit parameters and the performance (the performance values after the space conversion) by using these selected pareto optimal solutions. Namely, $p_k = f_k(x1, x2, \ldots, xn)$ is calculated. Here, "$p_k$" represents a performance value for the performance item k in the pareto optimal solution, and "xn" represents a value of the n-th circuit parameter in the pareto optimal solution. For example, "f" is calculated by fitting coefficients of the Taylor polynomial by using the method of least squares. Then, the circuit parameters $X = \{x1, x2, \ldots, xn\}$, which can realize the provisional optimal solution $P_0$ are calculated by using this expression $P=F(X)$. Incidentally, $P = \{p_1, \ldots, p_k\}$ and $\{f_1, \ldots, f_k\}$.

Explaining the final processing in detail, because the number k of the performance item is typically less than the number n of the circuit parameters, a set of x1, x2, xn cannot be obtained even by simply substituting the provisional optimal solution $P_0$ into the simultaneous equations $F=\{f_1, f_2, \ldots f_k\}$. Therefore, an optimization algorithm (e.g. a wel-known Nelder-Mead method (See R. Fletcher, Practical Methods of Optimization, John Wiley & Sons, 1991.)) is used to solve approximate x1, x2, ..., xn, which can realize the provisional optimal solution. This processing is used, for example, in Japanese Laid-open Patent Publication No. 2004-61372. Therefore, any further explanation is omitted.

After that, the optimal solution generation processor 13 outputs to the circuit simulator 9, data of the circuit configuration identified at the step S55, data of the peripheral circuits for the identified circuit configuration, which is stored in the test bench data storage 7, and the values of the circuit parameters, which are calculated at the step S59, to cause the circuit simulator 9 to carry out the well-known circuit simulation, and obtains the performance values of the respective performance items in the requirement specification from the circuit simulator 9. Then, the optimal solution generation processor 13 judges whether or not the provisional optimal solution after the reverse space conversion can be realized by the identified circuit configuration and circuit parameters (step S61). Namely, for each performance item in the requirement specification, the optimal solution generation processor 13 judges whether or not a value better than the value of the provisional optimal solution after the reverse space conversion is obtained in the circuit simulation. Namely, it is judged whether or not the cost lower than the cost of the provisional optimal solution after the reverse space conversion is obtained. The values of all of the performance items must be better than the corresponding performance values of the provisional optimal solution. Incidentally, the provisional optimal solution after the reverse space conversion is used, because the performance values of the provisional optimal solution should be compared with the results of the circuit simulation. When only comparing is executed, the results of the circuit simulation may be compared after the space conversion.

When the provisional optimal solution can be realized (step S63: Yes route), the optimal solution generation processor 13 stores the identified circuit configuration (e.g. only identifier of the identified circuit configuration may be stored) and the circuit parameters into the optimal data storage 14 (step S67). The provisional optimal solution after the reverse space conversion is also stored when it is compared with the requirement specification. Then, the processing returns to the calling source processing.

Figure 19:
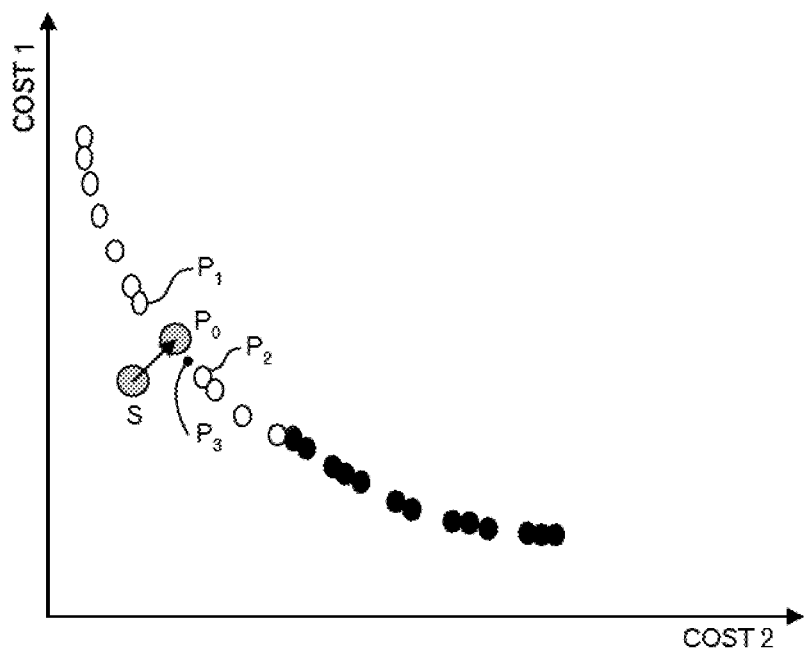
FIG. 19 is a schematic diagram to explain a processing to identify a circuit configuration corresponding to the provisional optimal solution.

On the other hand, when it is judged that the provisional optimal solution cannot be realized (step S63: No route), the optimal solution generation processor 13 extracts a next optimal solution in a range of the pareto optimal solutions close to the provisional optimal solution identified at the step S55, and further sets the circuit configuration of the pareto optimal solution nearest to the next optimal solution as the circuit configuration of the next optimal solution (step S65). In the example of FIG. 19, $P_3$ between the pareto optimal solutions $P_1$ and $P_2$ is identified. However, when no other solution cannot be found between the pareto optimal solutions $P_1$ and $P_2$, the pareto optimal solution $P_1$ or $P_2$ is adopted. After that, the processing returns to the step S57.

Incidentally, the steps S57 to S61 may be skipped because data stored in the entire pareto data storage 13 can be used as it is, when the provisional optimal solution is the pareto optimal solution.

In this embodiment, by carrying out such a processing, even when the requirement specification cannot be satisfied, it becomes unnecessary to repeat the same processing after changing the requirement specification. Namely, without carrying out a processing to generate the pareto optimal solutions stored in the entire pareto data storage 12 again and again, it is possible to identify the circuit parameters for the solution (i.e. which substantially corresponds to the specification after the change) nearer to the required values of the performance items in the requirement specification by utilizing the pareto optimal solutions again. Therefore, the processing time can be shortened.

Returning to the explanation of the processing in FIG. 5, the output unit 15 outputs data (e.g. circuit configuration and the circuit parameters. Depending on the situation, the performance values of the respective performance items for the provisional optimal solution after the reverse space conversion may be outputted) of the optimal solution stored in the optimal solution data storage 14 to the output device such as the display device or printer (step S9). Thus, the user can obtain the circuit configuration and circuit parameters to be adopted. Incidentally, when the provisional optimal solution is outputted, it becomes possible to judge the relation between the provisional optimal solution and the requirement specification. For example, it is possible to judge whether or not the provisional optimal solution satisfies the requirement specification. The output unit may judge whether or not the provisional optimal solution satisfies the requirement specification and output the judgment result.

[Second Embodiment]

Figure 20:
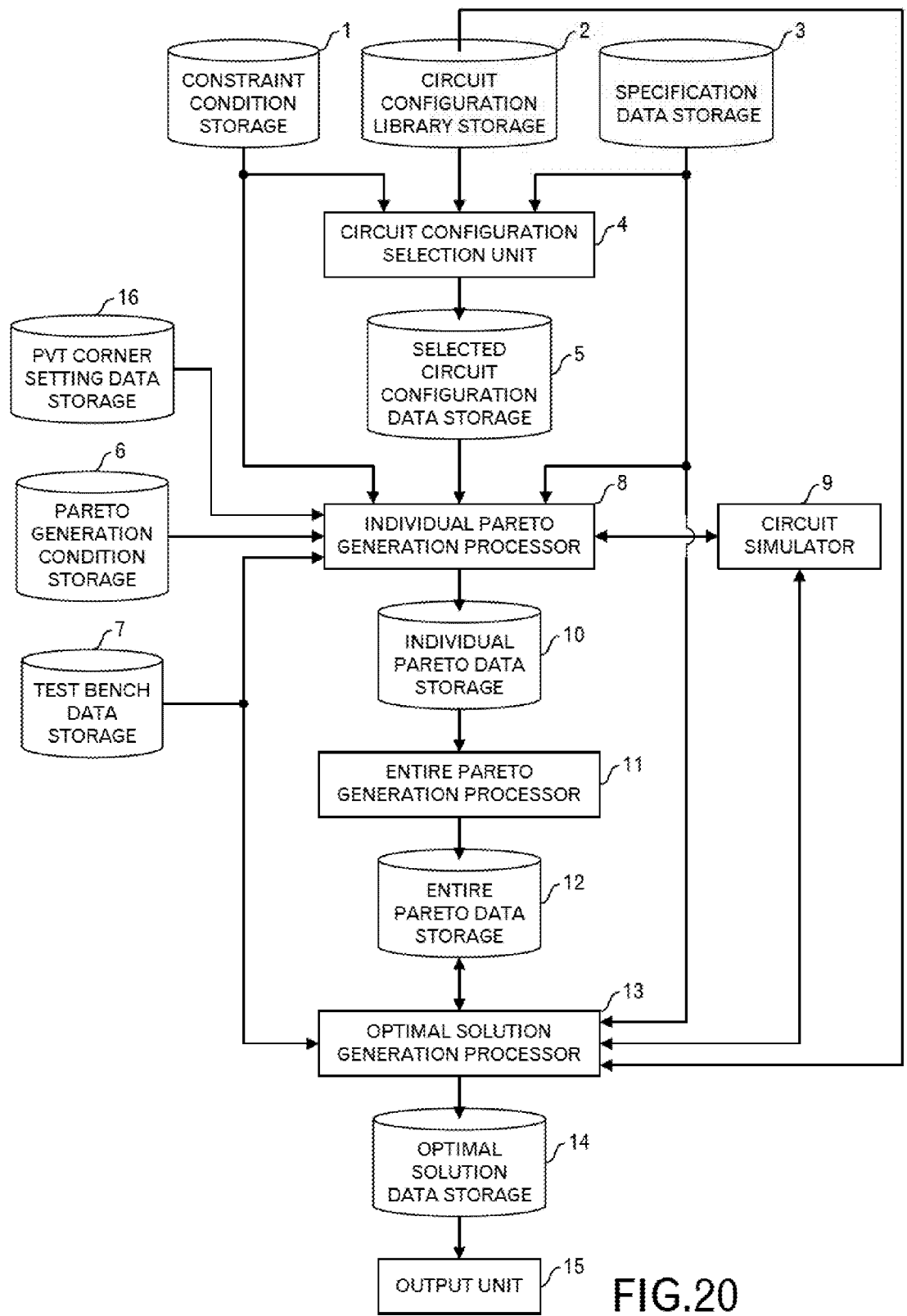
FIG. 20 is a functional block diagram of the automatic circuit design apparatus in a second embodiment of this technique.

FIG. 20 depicts a functional block diagram of an automatic circuit design apparatus relating to the second embodiment of this technique. Incidentally, the same reference numbers are attached to the same elements as the first embodiments. This automatic circuit design apparatus has (a) a circuit configuration library storage storing circuit configuration data of analogue circuits, which has been designed but whose circuit parameters are not defined; (b) a constraint condition storage 1 storing constraint conditions for the respective circuit configurations; (c) a PVT corner setting data storage 16 storing data to determine values of PVT (i.e. Process, Voltage and Temperature) corner setting items that may be changed due to factors other than the designer's intention; (d) a specification data storage 3 storing specification data of requirement specification designated by the user; (e) a circuit configuration selection unit 4, which selects the circuit configurations having possibility that the requirement specification is satisfied, by using data stored in the constraint condition storage 1, the circuit configuration library storage 2 and the specification data storage 3; (f) a selected circuit configuration data storage 5 storing data for the circuit configuration data selected by the circuit configuration selection unit 4; (g) a pareto generation condition storage 6 storing pareto generation conditions; a test bench data storage 7 storing data for peripheral circuits used for the simulation for each type of the circuit configuration, for instance; (i) a circuit simulator 9 such as Simulation Program with Integrated Circuit Emphasis (SPICE); (j) an individual pareto generation processor 8 to cooperate with the circuit simulator 9 and to generate pareto optimal solutions (hereinafter, may be called pareto. The pareto optimal solution will be explained later.) for each of the selected circuit configurations by using data stored in the constraint condition storage 1, the selected circuit configuration data storage 5, the specification data storage 3, the pareto generation condition storage 6, the test bench data storage 7 and the PVT corner setting data storage 16; (k) an individual pareto data storage 10 storing processing results of the individual pareto generation processor 8; (l) an entire pareto generation processor 11 to generate paretos in all of the selected circuit configurations by using data stored in the individual pareto data storage 10; (m) an entire pareto data storage 12 storing processing results by the entire pareto generation processor 3; (n) an optimal solution generation processor 13 that carries out a processing to identify the optimal circuit configuration and values of the respective parameters in the optimal circuit configuration by using data stored in the test bench data storage 7, the specification data storage 3, the entire pareto data storage 12 and the circuit configuration library storage 2; (o) an optimal solution data storage 14 storing processing results by the optimal solution generation processor 13; and (p) an output unit 15 to output data stored in the optimal solution data storage 14 to the user through an output device such as a display device or a printer. The optimal solution generation processor 13 also cooperates with the circuit simulator 9. In addition, the circuit simulator 9 may be implemented as an apparatus other than the automatic circuit design apparatus.

Thus, a point that the PVT corner setting data storage 16 is newly introduced and is used by the individual pareto generation processor 8 is different from the first embodiment.

FIG. 21 depicts an example of data stored in the PVT corner setting data storage 16. Before specifically explaining FIG. 21, the PVT corner setting items will be explained. The PVT corner setting item is an item that can be set to the circuit simulator 9 and varies separately from the intention of the designer. In addition, the PVT corner setting items may include the same items as the design variables defined in the constraint conditions. Moreover, the PVT corner setting items may include items different from the design variables defined in the constraint conditions.

As described in the first embodiment, the constraint condition is a condition for the design variable that can be designated by the designer, and the value of the design variable may be designated as the range. However, even when it is judged that a specific value (e.g. 1 μm) is appropriate in the designated range and a chip is manufactured according to this specific value, a different value such as 1.07 μm or 95 nm from the specific value "1 μm" may be actually realized. Similarly, even when a chip is manufactured presupposing the temperature condition is 25 degrees, an actual operation temperature may become 30 degrees. Also as for the operation voltage, even when 1.5 V is designated as an appropriate voltage, 1.3 V may be supplied in the actual operation environment. Thus, item names, data to define fluctuation ranges and the like are stored in the PVT corner setting data storage 16 for the items whose value varies separately from the intention of the designer.

FIG. 21 depicts an example of data used in a case where a corner simulation described later is carried out. In an example of FIG. 21, for each of the PVT corner setting items, the minimum value (MIN), the representative value (e.g. average or median) (TYP) and the maximum (MAX) are registered. In the corner simulation, basically, the circuit simulation is carried out for all combinations of the setting values of the respective items. Therefore, because the number of combinations exponentially increases as the number of items increases, and the processing load also increases, the number of combinations may be decreased by setting, for example, only the representative values for the items having less influence or items having a narrow fluctuation range. In a case of FIG. 21, only the representative value is set for the item "PolyCD".

Figures 23, 24:
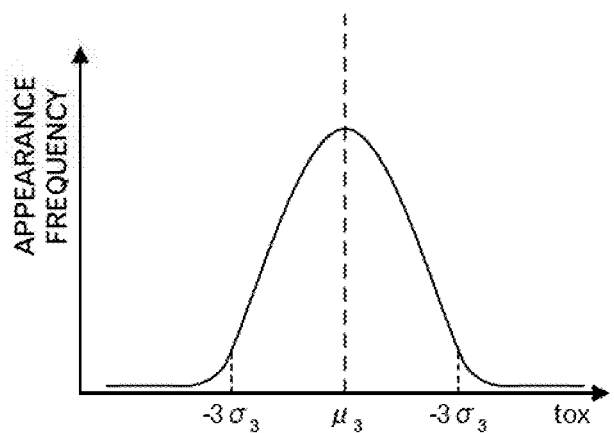
FIG. 23 is a schematic diagram to explain appearance distribution.
FIG. 24 is a diagram depicting an example of data stored in a PVT corner setting data storage.

In addition, FIG. 22 depicts another example of data used in a case where the corner simulation is carried out. In an example of FIG. 22, for each of the PVT corner setting items, appearance range data of the value of the item and combination information are registered. The appearance range data is data representing the appearance distribution of the value of that PVT corner setting item. For example, the appearance distribution of the value of Tox is Gaussian distribution, and its average is $\mu_3$ and the variance is $\sigma_3$. For example, because cases equal to or greater than 99% are covered by a range from $(\hat{1}_3 - 3\hat{o}_3)$ to $(\hat{1}_3 + 3\hat{o}_3)$, $(\hat{1}_3 - 3\hat{o}_3)$ is set as the lower limit value and $(\hat{1}_3 + 3\hat{o}_3)$ is set as the upper limit value, as depicted in FIG. 23 in this embodiment. In addition, as for the voltage V, for example, the flat appearance distribution (i.e. uniform) is adopted, and an example that a value is determined in a range from (the median c−a %) to (the median c+b %) is depicted. The temperature is similarly defined. As for the combination information, as depicted in FIG. 21, in order to decrease the number of combinations, value types to be used for the combination are indicated. In an example of FIG. 22, in case of Leff, the combination information representing the upper limit value max and the lower limit value min are combined is registered. In addition, in the example of FIG. 22, in case of rshncd, the representative value typ is merely registered as the combination information.

Furthermore, FIG. 24 depicts an example of data used in a case where the Monte Carlo simulation is carried out. Although it is described below, when the Monte Carlo simulation is carried out, the random number is generated plural times for each of the PVT corner setting items, and the circuit simulation is carried out plural times for the combinations of the random numbers generated for the respective PVT corner setting items. In an example of FIG. 24, for each of the PVT corner setting items, the random number generation distribution data is registered. In the example of FIG. 24, the random number generation distribution for Leff is Gaussian distribution, and its average is $\mu_{11}$, and the variance is $\sigma_{11}$. In addition, in the example of FIG. 24, as for the voltage V and the temperature T, uniform distributions from (c−a %) to (c+b %) and from (f−d %) to (f+e %) are defined. According to these random number generation distribution data, the random number is generated and used for the pertinent item.

In this embodiment, basically, the processing of the individual pareto generation processor 8 is changed as described later. The presupposition that the PVT corner setting data storage 16 is used will be explained before explaining this processing.

Figure 25:
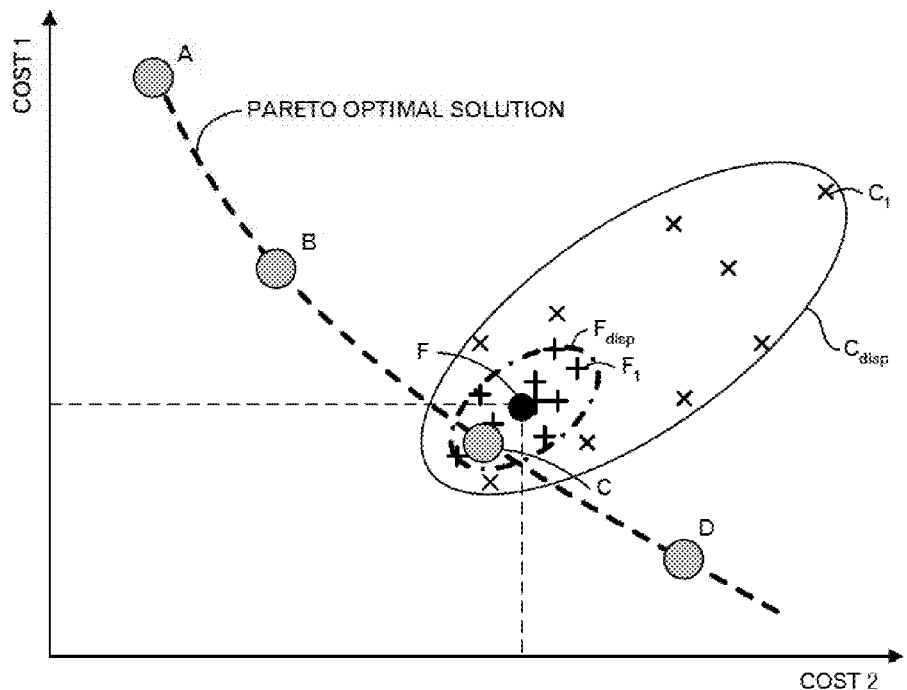
FIG. 25 is a diagram to explain problems when a pareto curve is formed for nominal values.

Although the pareto curve itself is depicted in FIG. 6, it is preferable to calculating the pareto optimal solution using the nominal values of the parameters for the manufacturing process and operation environment without considering the dispersion in the manufacturing process and the fluctuation of the operation environment, that the pareto optimal solution is calculated taking into account the dispersion in the manufacturing process and the fluctuation of the operation environment because of the following reasons. The reason will be explained by using FIG. 25. Similar to FIG. 6, in FIG. 25, the vertical axis represents cost1 (the lesser the value is, the better the performance is.), and the horizontal axis represents cost2 (the lesser the value is, the better the performance is.) Then, in FIG. 25, it is presupposed that the pareto optimal solutions A to D can be obtained based on the nominal values of the parameters. Here, the non-dominated solution C is obtained, as described above, when the nominal values are used for the parameters. However, when the dispersion in the manufacturing process and the fluctuation of the operation environment are taken into account for the pareto optimal solution C, solutions are obtained at points of "x" marks in a range $C_{disp}$. On the other hand, a solution F calculated by using the nominal value is not on the pareto curve, because C dominates F. However, it is presupposed that only solutions marked by "+" within a range $F_{disp}$, which is included in the range $C_{disp}$ and is narrower than the range $C_{disp}$, are obtained even if the dispersion in the manufacturing process and the fluctuation of the operation environment are taken into account for the solution F. In such a case, the solution C is the pareto optimal solution when the nominal values of the parameters are used. However, a solution $C_1$ is obtained when the manufacturing process and the operation environment badly affect. On the other hand, a solution $F_1$ is obtained for the solution F, even when the manufacturing process and the operation environment badly affect. In such a case, because $F_1$ dominates $C_1$, it is doubtful that the pareto optimal solution C is preferable. Namely, even when the pareto curve is generated based on the nominal values of the parameters, the actually manufactured chip may demonstrate the expected performance. However, it is preferable that the design is carried out taking into account the worst states, because there are various problems such as the manufacturing yield and the basic non-linearity of the analogue circuits, namely, the easiness of the performance fluctuation.

Figure 26:
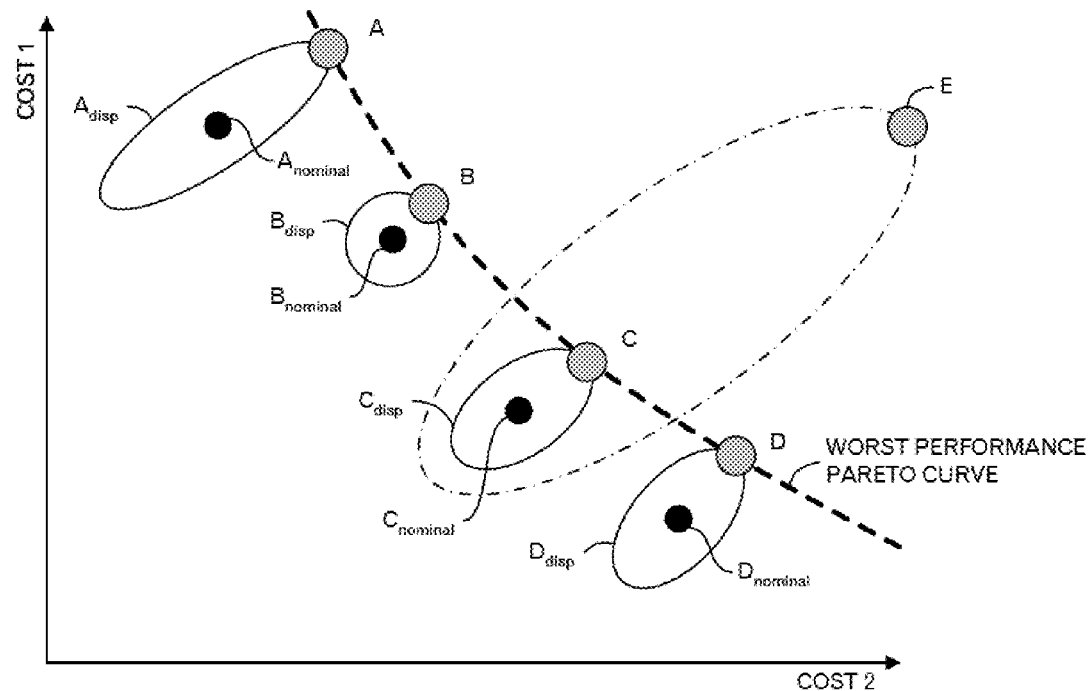
FIG. 26 is a diagram to explain the pareto curve for the worst performance.

Then, in this embodiment, as depicted in FIG. 26, the dominance relation is judged based on the solutions A to E having the largest costs (i.e. having the worst performance) in the ranges $A_{disp}$ to $D_{disp}$, which are determined for the respective solutions, taking into account the dispersion in the manufacturing process and the fluctuation of the operation environment, and the pareto optimal solutions A to D are identified without adopting the solutions $A_{nominal}$ to $D_{nominal}$ for the nominal values of the parameters. Based on these pareto optimal solutions A to D, the worst performance pareto curve is generated.

Accompanying finer design rules of the semiconductor process, values of parameters such as the threshold voltage of the transistor and the effective channel length largely vary from the nominal values (i.e. expected values) due to the dispersion in the manufacturing process, and the performance dispersion of the analogue circuit is enlarged because of that influence. In addition, because the threshold voltage of the transistor and power supply voltage of the chip are reduced to the limit in order to reduce the power consumption of the Large Scale Integrated circuit (LSI), the fluctuation of the circuit operation environment such as the power supply voltage and circuit operation temperature largely affects the LSI, especially the performance of the analogue circuit that frequently operates in the saturated region. This embodiment removes the influence due to the dispersion in the semiconductor manufacturing process and the fluctuation of the circuit operation environment as much as possible by identifying the pareto optimal solutions while considering the dispersion in the semiconductor manufacturing process and the fluctuation of the circuit operation environment. Thus, it becomes possible that the manufacturing yield of the chip is rapidly improved (ideally, the yield reaches 100%), and the performance is secured with enough margin.

Under this presupposition, the individual pareto generation processing will be explained according to FIG. 27. Incidentally, in FIG. 27, the same step numbers are used when the same processing as FIG. 7 is carried out. First, the individual pareto generation processor 8 identifies one unprocessed circuit configuration among the selected circuit configurations stored in the selected circuit configuration data storage (step S11). Then, the individual pareto generation processor 8 generates, for the identified circuit configuration, values of the design variables (e.g. circuit parameters including the gate length L and gate width W) that satisfy the corresponding constraint condition for the identified circuit configuration, which are stored in the constraint condition storage 1, by the random numbers, and stores the generated values into the storage device such as the main memory (step S13).

Then, the individual pareto generation processor 8 carries out a worst performance value obtaining processing (step S16). This worst performance value obtaining processing will be explained by using FIGS. 28 to 31. First, a processing flow when the corner simulation is carried out will be explained by using FIG. 28.

The individual pareto generation processor 8 identifies, for each of the PVT corner setting items registered in the PVT corner setting data storage 16, corner values (e.g. values designated among MIN, MAX and TYP) to be adopted based on setting conditions (in case of FIG. 21, MIN, TYP and MAX and in case of FIG. 22, the appearance range data and combination information) stored in the PVT corner setting data storage 16, and stores the identified values into the storage device such as the main memory (step S101). In case of FIG. 21, because the numeral values are designated by MIN, TYP and MAX, these are identified. In case of FIG. 22, when the distribution is defined as the appearance range data, a value calculated by (the average $\mu+3\sigma$) and a value calculated by (the average $\mu-3\sigma$) are identified, for example. Incidentally, as for the same item as the constraint condition, the value identified at the step S13 or step S21 described later is set as the average $\mu$ or the median c, and the values of $+3\sigma$ and $-3\sigma$ and values of $-a$ % and $+b$ % are calculated. For instance, the constraint condition defines a range from 1V to 5V for the voltage, and when the value identified at the step S13 or S21 is 1.5V, 1.5V is set as TYP, and 1.35V is calculated as MIN defined as $-a$ % ($=-10$%), and 1.65V is calculated as MAX defined as $+b$ % ($=+10$%).

Then, the individual pareto generation processor 8 identifies one unprocessed combination of the corner values for the respective PVT corner setting items (step S103). Furthermore, the individual pareto generation processor 8 reads out data of the peripheral circuits required for the circuit simulation for the identified circuit configuration from the test bench data storage 7, outputs to the circuit simulator 9, the read data of the peripheral circuits, data of the identified circuit configuration stored in the selected circuit configuration data storage 5, values of the design variables identified at the step S13 or S21 based on the constraint condition, the combination of the corner values for the PVT corner setting items and items (i.e. performance items) of the requirement specification stored in the specification data storage 3, causes the circuit simulator 9 to evaluate the respective performance items defined in the requirement specification, obtains the performance values of the respective performance items defined in the requirement specification from the circuit simulator 9, and stores the obtained data into the storage device such as the main memory (step S105).

Then, the individual pareto generation processor 8 judges whether or not all of the combinations of the corner values identified at the step S101 have been processed (step S107). When there is at least one unprocessed combination, the processing returns to the step S103. On the other hand, when all of the combinations have been processed, the individual pareto generation processor 8 identifies the performance (i.e. a set of performance values) considered to be worst among the performances each including values of the performance items defined in the requirement specification and the combination of the values of the design variables identified based on the constraint condition and the corner values of the PVT corner setting items, which cause the performance considered to be worst, and stores the identified data into the storage device such as the main memory (step S109).

Here, the performance considered to be worst means the worse performance $P_w$ even when compared with all other performances $P_j$ belonging to a dispersion space $\Omega_f$ of the performance values calculated at the step S105 for all combinations of the corner values of the PVT corner setting items. More specifically, when it is presupposed that the optimum means the minimum (e.g. in a graph of FIG. 26 and the like, the direction of the lower left is an optimal direction.), the respective performance item values $P_{wi}$ of the performance $P_w$ considered to be worse are larger than the values $P_{ji}$ of the respective performance items i for the performance $P_j$ (the number of performance items is n, and $P_j$ is an n-dimensional vector.) for all combinations j of the corner values of the respective PVT corner setting items.

$$P_w: \{P_{wi}|(\forall i\forall j)P_{wi} \geq P_{ji}, P_j \in \Omega_f\}, P_w \in R^n, i=1\ldots n$$

More specifically, it is represented as follows:
$P_w = \{P_{wi}|P_{wi} = \max(P_{ji}), P_j \in \Omega_f\}$ In this case, the performance $P_w$ that all of the performance item values are worst among all performances $P_j$ belonging to the performance dispersion space $\Omega_f$ is considered to be worst. However, this is a mere example, and the performance that an evaluation value of any evaluation equation for evaluating the respective performance item values is greatest may be defined to be worst.

Incidentally, data stored at the step S109 is data as depicted in FIG. 29, for example. In an example of FIG. 29, values of the design variables 1 to k, values of the PVT corner setting items 1 to p (as for the same items as the design variables, an adjustment value against the value identified by the constraint condition) and the values of the performance items 1 to n are registered in association with the identifier of the circuit configuration. Incidentally, as for the design variables that are also the PVT corner setting items, the value set at the step S13 or S21 are registered.

By carrying out the aforementioned processing, it is possible to identify the worst performance when one constraint condition set is identified. Then, the processing returns to the calling source processing.

Figure 28:
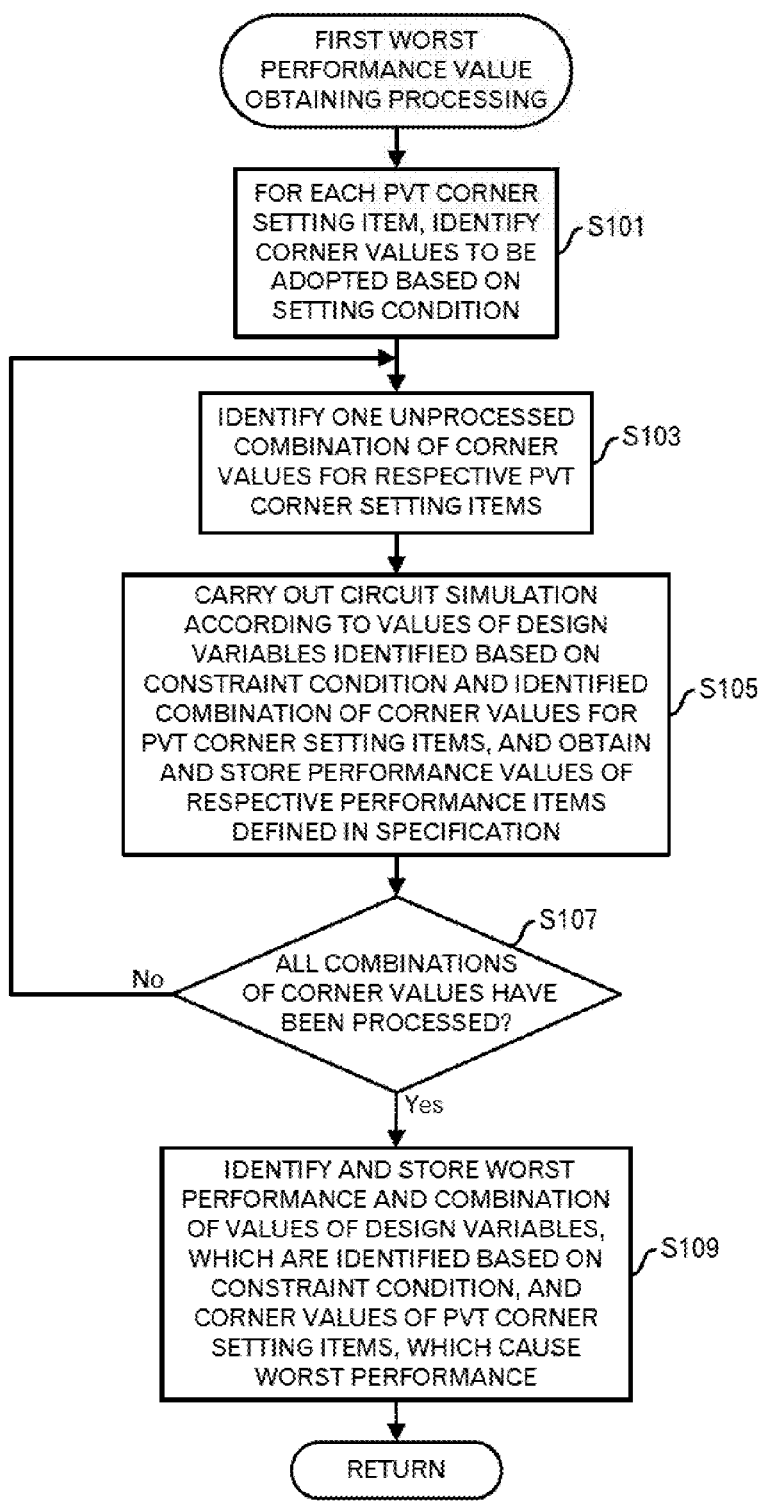
FIG. 28 is a diagram depicting a first example of a worst performance value obtaining processing.
Figure 30:
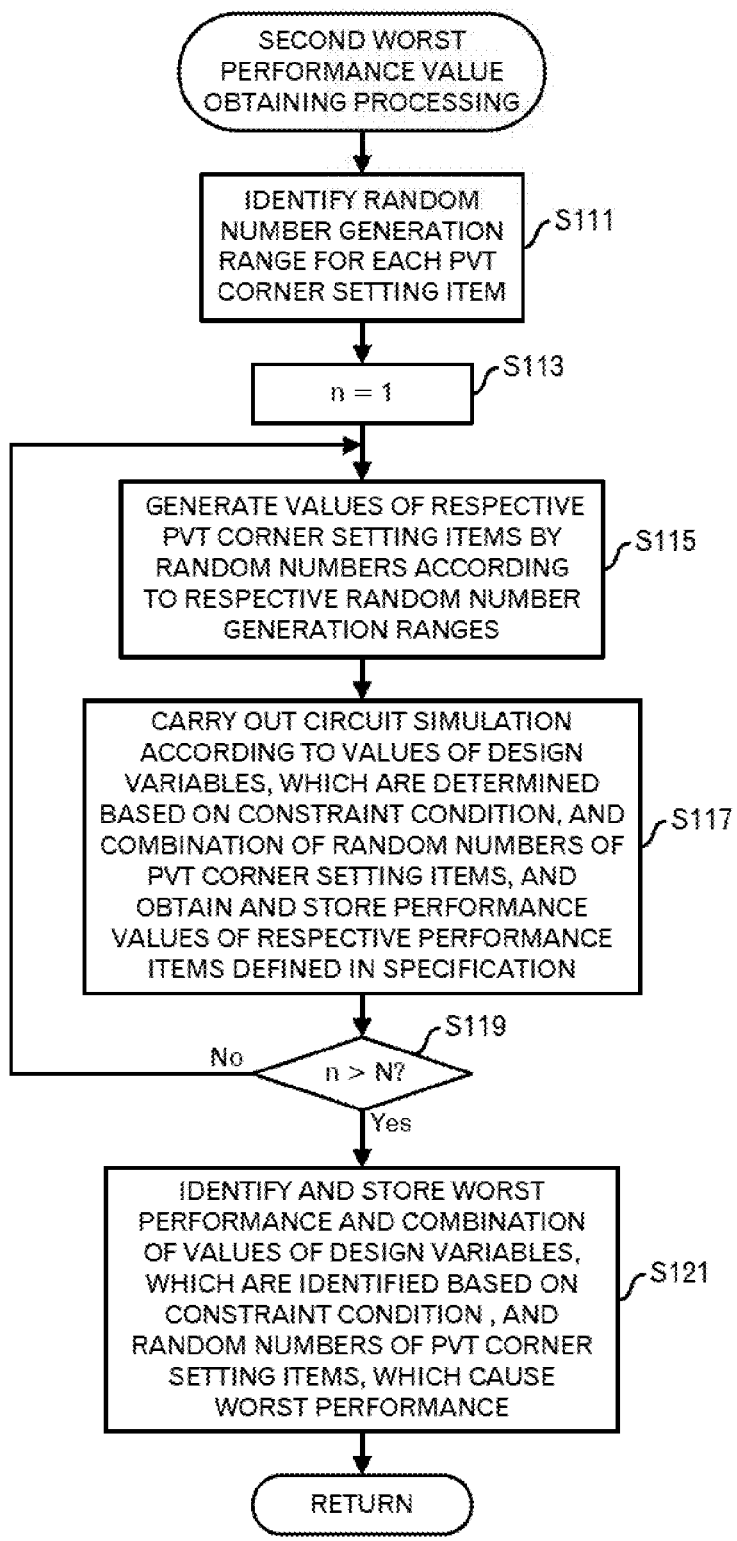
FIG. 30 is a diagram depicting a second example of the worst performance value obtaining processing.

The processing flow of FIG. 28 represents a processing flow to identify the worst performance by the corner simulation. However, the applicable algorithm for the worst performance value obtaining processing in this embodiment is not limited to the corner simulation. FIG. 30 depicts a processing when the Monte Carlo simulation is applied.

First, the individual pareto generation processor 8 identifies the random number generation range for each of the PVT corner setting item registered in the PVT corner setting data storage 16 (step S111). In the example of FIG. 24, when the random number generation distribution data is defined by, for example, the Gaussian distribution, the values of the average μ and variance σ are identified. Incidentally, as for the PVT corner setting item that is identical with the constraint condition, the values identified at the step S13 or step S21 described later are used as the average μ or median c, and "a" and "b" defining the variance σ or range are used as they are. For instance, the constraint condition defines a range from 1V to 5V for the voltage, and when the value identified at the step S13 or S21 is 1.5V, 1.5V is set as the median, and 1.35V is calculated as the lower limit value of the random number generation, which is defined as −a % (=−10%), and 1.65V is calculated as the upper limit value of the random number generation, which is defined as +b % (=+10%), and the range of the random number generation is defined by the lower limit value and the upper limit value.

Furthermore, the individual pareto generation processor 8 initializes a counter n to "1" (step S113), and generates the values of the respective PVT corner setting items by the random number, according to the respective random number generation ranges identified at the step S111, and stores the generated values into the storage device such as the main memory (step S115).

Furthermore, the individual pareto generation processor 8 reads out data of the peripheral circuits required for the circuit simulation for the identified circuit configuration from the test bench data storage 7, outputs to the circuit simulator 9, the read data of the peripheral circuits, data of the identified circuit configuration stored in the selected circuit configuration data storage 5, the values of the design variables identified at the step S13 or S21 based on the constraint condition, the combination of the random numbers of the PVT corner setting items and items (i.e. performance items) in the requirement specification stored in the specification data storage 3, and causes the circuit simulator 9 to evaluate the respective performance items defined in the requirement specification, obtains the performance values of the respective performance items defined in the requirement specification from the circuit simulator 9, and stores the obtained data into the storage device such as the main memory (step S117).

Then, the individual pareto generation processor 8 judges whether or not "n" exceeds a predetermined upper limit value N (step S119). When "n" is equal to or less than N, the processing returns to the step S115. On the other hand, when "n" exceeds N, the individual pareto generation processor 8 identifies the performance (i.e. a set of performance values) considered to be worst among the performances each including values of the performance items defined in the requirement specification and the combination of the values of the design variables identified based on the constraint condition and the random numbers of the PVT corner setting items, which cause the performance considered to be worst, and stores the identified data into the storage device such as the main memory (step S121). Data stored at the step S121 has the same format as in FIG. 29. In addition, the performance considered to be worst is as described above. Then, the processing returns to the calling source processing.

By carrying out the aforementioned processing, the worst performance can be identified even by using Monte Carlo simulation.

Figure 27:
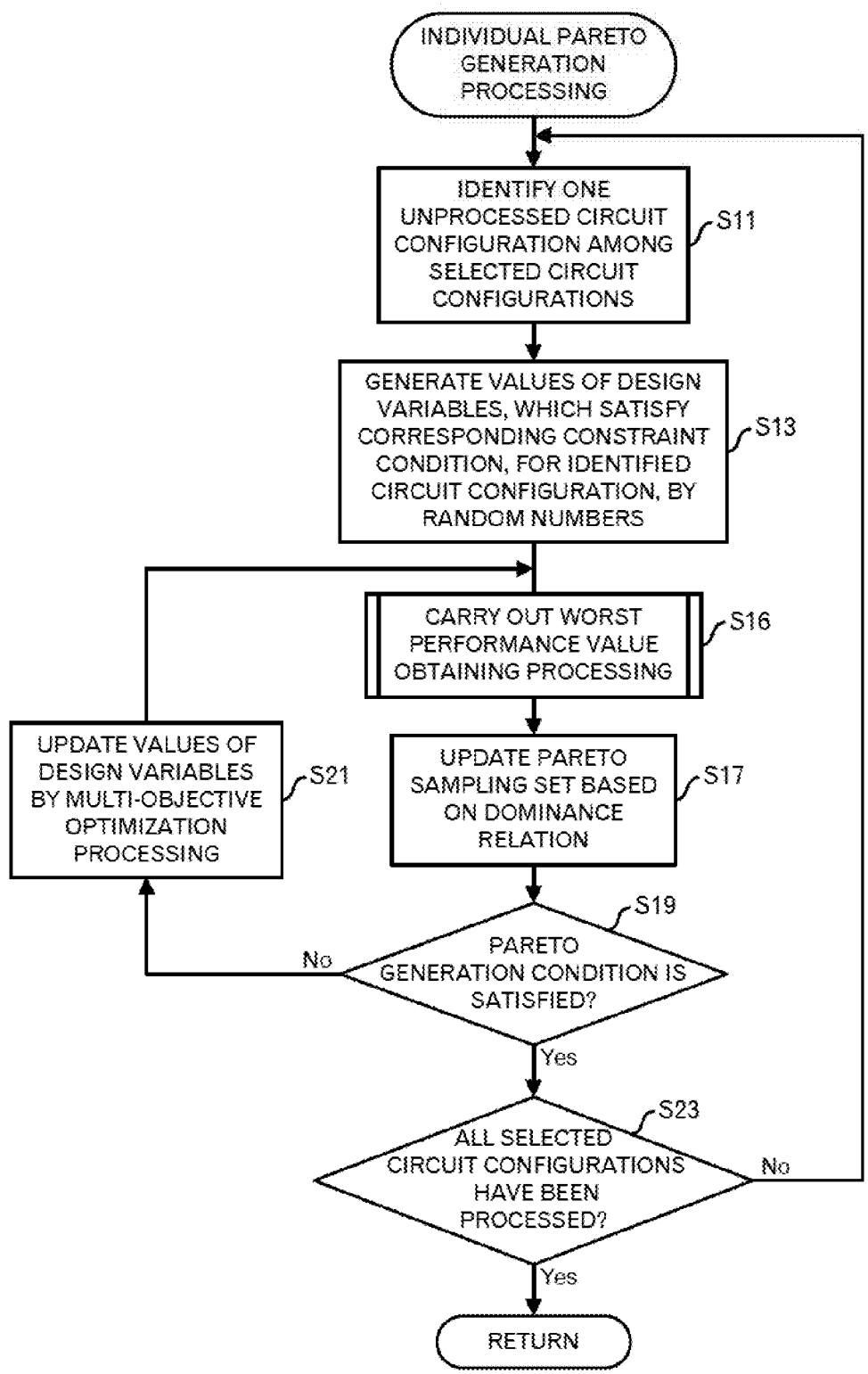
FIG. 27 is a diagram depicting a processing flow of the individual pareto generation processing in the second embodiment.

Returning to the explanation of the processing in FIG. 27, the individual pareto generation processor 8 judges by confirming the dominance relation with the respective pareto optimal solutions selected prior to this, whether or not the performance value set of the performance items, which are obtained at the step S16, constitutes the pareto optimal solution in the solution space, and updates the pareto sampling set based on the judgment result (step S17). Namely, when the solution constituted by the performance value set of the performance items, which are obtained at the step S16, dominates other solution, this other solution is removed from the pareto sampling set that is a set of the pareto optimal solutions, and the solution obtained at the step S16 is added to the pareto sampling set. On the other hand, when the solution obtained at the step S16 is dominated by other solution, this solution obtained at the step S16 is discarded.

The pareto sampling set is stored, for example, into the individual pareto data storage 10 as data as depicted in FIG. 31. In an example of FIG. 31, an identifier of the circuit configuration, values of the design variables 1 to k, values of the PVT corner setting items 1 to p and values of the performance items 1 to n are registered. The number of variables, the number of PVT corner setting items and the number of performance items are mere examples, and those numbers may be larger. Thus, data for one pareto optimal solution is registered as one record. Then, records for one circuit configuration constitute the pareto sampling set. In addition, the data of the circuit configuration is also stored into the individual pareto data storage 10.

After that, the individual pareto generation processor 8 judges whether or not the pareto generation condition stored in the pareto generation condition storage 6 is satisfied (step S19). The pareto generation condition is the same as that described for the first embodiment, and further explanation is omitted.

When the pareto generation condition is not satisfied, the individual pareto generation processor 8 updates the values of the design variables so as to satisfy the constraint conditions by the aforementioned well-known multi-objective optimization processing (e.g. crossover processing or mutation processing), and stores the updated values into the storage device such as the main memory (step S21). Then, the processing returns to the step S16.

On the other hand, when the pareto generation condition is satisfied, the individual pareto generation processor 8 judges whether or not all of the selected circuit configuration have been processed (step S23). When there is at least one unprocessed circuit configuration, the processing returns to the step S11. On the other hand, when there is no unprocessed circuit configuration, the processing returns to the calling source processing.

By carrying out such a processing, a set of the pareto optimal solutions is generated for each circuit configuration. When schematically representing the solution space as the two-dimensional space, the plural solutions constituting the pareto curve as depicted in FIG. 10 are obtained.

Incidentally, depicting in detail, FIG. 10 represents a relation as depicted in FIG. 26. The pareto curve (pareto curved surface in the three-dimensional space or more) in FIG. 26, namely, the non-dominated solutions $Pw\_pareto$ are represented as follows:

$$P_{w\_Pareto} = \{P_i | \forall j(j \neq i), \neg (P_{jworst} \prec P_{iworst}), P_i, P_j \in \Omega_p\}$$

Incidentally, the meaning of the symbol between $P_{jworst}$ and $P_{iworst}$ is as follows:

$$a \prec b \Leftrightarrow \forall i(a_i \leq b_i) \exists i(a_i < b_i) \quad (A)$$

Thus, the worst performance pareto curve is formed based on a condition that, when the solutions $P_i$ and $P_j$ for the nominal values, which belong to the solution space $\Omega_p$, are presupposed, the worst performance solution $P_{iworst}$, which follows the constraint condition of the solution $P_i$ is a non-dominated solution against the worst performance solution $P_{jworst}$, which follows the constraint condition of any solution $P_j$.

In addition, data as depicted in FIG. 32 is stored in the entire pareto data storage 12. Only records corresponding to the pareto optimal solutions for all of the selected circuit configurations are included in the table in FIG. 32 among the records as depicted in FIG. 31. Namely, an identifier of the circuit configuration, values of the design variables 1 to k, values of the PVT corner setting items 1 to p and the performance items 1 to n are registered. Incidentally, data of the pertinent circuit configurations is also stored into the entire pareto data storage 12.

When the processing of the step S5 and subsequent steps in FIG. 5 is carried out almost similar to the first embodiment after the aforementioned processing is carried out, it becomes possible to automatically identify the optimal solutions that the manufacturing yield, which is ideally almost 100% at the manufacturing, is realized, for the multi-dimensional requirement specification, from the circuit configuration library including plural circuit configurations, by taking into account the dispersion in the manufacturing process and the fluctuation of the operation environment.

Incidentally, as for the item identical with the PVT corner setting item among the circuit parameters whose value is determined at the step S59, a value adjusted by the value stored in the entire pareto data storage 12 is adopted.

Furthermore, at the step S9 of FIG. 5, the performance values of the respective performance items for the provisional optimal solution after the reverse space conversion may be outputted.

Although the embodiments are described above, this technique is not limited to these embodiments. For example, the configurations of the automatic circuit design apparatuses depicted in FIGS. 1 and 20 are mere examples, and do not always correspond to the actual program module configuration. In addition, the data storage method may be changed. For example, the circuit configuration library storage 2 and the constraint condition storage 1 may be integrated.

In addition, as long as the processing result does not change, the order of the step in the processing flow may be changed or plural steps may be executed in parallel. Especially, the circuit simulator 9 may be implemented in plural different apparatuses, and the individual pareto generation processor 8 may instruct the respective circuit simulators 9 to carry out the circuit simulation for different circuit configurations.

Furthermore, although an example is described that the corner simulation or Monte Carlo simulation is carried out, other methods that can identify the worst performance may be adopted, such as statistical analysis.

In the aforementioned example, the automatic circuit design apparatus is implemented by a stand-alone type computer. However, a client-server type computer system may be adopted. Furthermore, the processing at the step S51 may not be carried out collectively, but a calculation equation for the space conversion $P_{tran}$ may be generated in advance and may be held to execute the space conversion every time the calculation of the distance is required.

Figure 33:
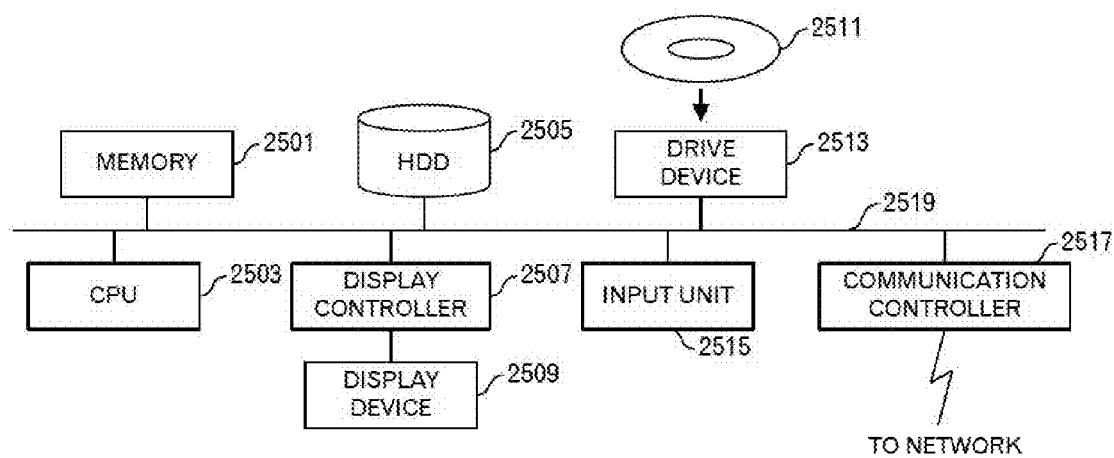
FIG. 33 is a functional block diagram of a computer.

In addition, the automatic circuit design apparatus is a computer device as shown in FIG. 33. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 33. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are outlined as follows:

An automatic circuit design method includes (A) extracting circuit configurations having possibility that requirement specification is satisfied, from a circuit configuration data storage device storing data of the circuit configurations; (B) for each of the extracted circuit configurations, obtaining a plurality of simulation results for respective items in the requirement specification by circuit simulation while changing a value of each design variable for the circuit configuration so as to satisfy a constraint conditions of the circuit configuration, extracting a set of pareto optimal solutions that are non-dominated solutions in a solution specification space for the respective items in the requirement specification, from the simulation results, and storing respective pertinent values of the design variables and pertinent values of the respective items in the requirement specification for each of the pareto optimal solutions into an individual circuit configuration pareto data storage device in association with the extracted circuit configuration; (C) extracting second pareto optimal solutions that are non-dominated solutions among all of the pareto optimal solutions, which are stored in the individual circuit configuration pareto data storage device, for all of the extracted circuit configurations, and storing, for each of the extracted second pareto optimal solutions, an identifier of the pertinent circuit configuration, the respective pertinent values of the design variables and the pertinent values of the respective items in the requirement specification into an entire pareto data storage device; (D) calculating, as a provisional optimal solution, a point whose distance from a point corresponding to the requirement specification after space conversion of the solution specification space to balance value distribution for the items in the requirement specification, is shortest and which is on a pareto curve of the second pareto optimal solutions after the space conversion is carried out for the second pareto optimal solutions stored in the entire pareto data storage device, in the solution specification space after the space conversion; (E) extracting a pareto optimal solution close to the provisional optimal solution in the solution specification space after the space conversion, from the second pareto optimal solutions after the space conversion is carried out for the second pareto optimal solutions stored in the entire pareto data storage device, and identifying circuit configuration for the provisional optimal solution from the extracted pareto optimal solution close to the provisional optimal solution; (F) mapping the provisional optimal solution to values of the respective design variables in the identified circuit configuration; and (G) outputting the identifier of the identified circuit configuration and the values of the respective design variables in the identified circuit configuration, which are obtained by the mapping.

By carrying out such a processing, it is possible to identify the provisional optimal solution closer to the requirement specification even in case where the requirement specification is satisfied or in case where the requirement specification is not satisfied, and it is unnecessary to repeat the processing, which was carried out, in the conventional art, when the requirement specification is not satisfied. Hence, the processing time is shortened.

Incidentally, the aforementioned processing (B) may include carrying out the circuit simulation a plurality of times while changing values of specific items among the items, which can be set in the circuit simulation, and adopting as one simulation result of the plurality of simulation results, a result indicating worst performance among a plurality of results of the circuit simulation.

Thus, when the circuit configuration and the design variable values are identified by carrying out the aforementioned processing, after the pareto optimal solutions are generated by adopting the result indicating the worst performance, and a chip is manufactured by using the identified circuit configuration and design variable values, it is expected that a chip embodying circuits satisfying the requirement specification or having the performance close to the requirement specification is obtained even in the worst case. Namely, because the design can be carried out taking into account the worst case of the dispersion in the manufacturing and the like, the rapid improvement of the manufacturing yield is expected.

In addition, this automatic circuit design method may further include carrying out the circuit simulation by using values of the respective design variables for the circuit configuration, which are obtained by the mapping, and judging whether or not the provisional optimal solution after the reverse space conversion of the space conversion can be realized. In such a case, the outputting may be executed when it is judged that the provisional optimal solution can be realized. This is to output the processing result after confirming whether or not a circuit that can actually achieve the same performance as the provisional optimal solution can be realized.

In addition, this automatic circuit design method may further include, when it is judged that the provisional optimal solution after the reverse space conversion of the space conversion cannot be realized, identifying a next candidate solution from the second pareto optimal solutions close to the provisional solution, and identifying the second circuit configuration for the next candidate solution; mapping the next candidate solution to values of the respective design variables for the identified second circuit configuration; judges by carrying out the circuit simulation by using the values of the respective design variables for the identified second circuit configuration, which are obtained by the mapping the next candidate solution, whether or not the next candidate solution after the reverse space conversion can be realized; when it is judged that the next candidate solution can be realized, outputting the identified second circuit configuration and the values of the respective design variables for the identified second circuit configuration, which are obtained by the mapping the next candidate solution. Thus, when the circuit to actually achieve the same performance as the provisional optimal solution cannot be realized, the next candidate is identified from the second pareto optimal solutions close to the provisional optimal solutions and is examined to identify a set of the next appropriate circuit and circuit design values.

Furthermore, the aforementioned carrying out and adopting may include generating, by the random numbers, values of the respective specific items based on data of a random number generation range designated for the respective specific items; and carrying out the circuit simulation for a set of the generated values of the respective specific items. For example, this is to identify the result indicating the worst performance by, for example, the Monte Carlo simulation.

In addition, the aforementioned carrying out and adopting may include identifying values preselected among an upper limit value, a representative value and a lower limit value of the respective specific items based on corner value setting data designated for the respective specific items; and carrying out the circuit simulation for each combination of the values preselected among the upper limit value, the representative value and the lower limit value of the respective specific items. For example, the result indicating the worst performance may be identified by the corner simulation.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer non-transitory readable storage medium storing a program for causing a computer to execute an automatic circuit design process, comprising:

extracting one or more kinds of circuit configurations having possibility that requirement specification is satisfied, from a circuit configuration data storage device storing data of a plurality of kinds of circuit configurations;

for each of the one or more kinds of circuit configurations, obtaining a plurality of simulation results for respective items in said requirement specification by circuit simulation while changing a value of each design variable for the circuit configuration so as to satisfy a constraint condition of the circuit configuration, extracting first Pareto optimal solutions, each of which is not dominated by other solutions, in a solution specification space for said respective items in said requirement specification, from said simulation results, wherein a first solution dominates a second solution, when all values of the respective items of the second solution are inferior to corresponding values of the respective items of the first solution, and storing respective pertinent values of said design variables and pertinent values of said respective items in said requirement specification for each of said first Pareto optimal solutions in association with the circuit configuration;

extracting second Pareto optimal solutions whose at least one of values of the respective items in said requirement specification is not inferior to a corresponding value for other solutions from among all of said first Pareto optimal solutions for all of the one or more kinds of circuit configurations, and storing, for each of the extracted second Pareto optimal solutions, an identifier of the pertinent circuit configuration, said respective pertinent values of said design variables and said pertinent values of said respective items in said requirement specification;

calculating a provisional optimal solution whose distance from a point corresponding to said requirement specification after space conversion of said solution specification space to balance value distribution for said items in said requirement specification, is shortest and which is on a Pareto curved surface of said second Pareto optimal solutions after said space conversion is carried out for said second Pareto optimal solutions, in said solution specification space after said space conversion;

extracting a specific Pareto optimal solution close to said provisional optimal solution in said solution specification space after said space conversion, from said second Pareto optimal solutions after said space conversion is carried out for said second Pareto optimal solutions, and identifying a circuit configuration for said provisional optimal solution from the extracted specific Pareto optimal solution;

mapping said provisional optimal solution to values of said respective design variables in the identified circuit configuration; and outputting said identifier of the identified circuit configuration and said values of said respective design variables in the identified circuit configuration, which are obtained by said mapping.

2. The computer-readable storage medium as set forth in claim 1, wherein said obtaining, extracting and storing comprises: carrying out said circuit simulation a plurality of times while changing values of specific items among said items that can be set in said circuit simulation, and adopting, as one simulation result of said plurality of simulation results, a result indicating worst performance among a plurality of results of said circuit simulation.

3. The computer-readable storage medium as set forth in claim 2, wherein said carrying out and adopting comprises:

generating, by random numbers, values of said respective specific items based on data of a random number generation range designated for said respective specific items; and carrying out said circuit simulation for a set of the generated values of said respective specific items.

4. The computer-readable storage medium as set forth in claim 2, wherein said carrying out and adopting comprises:

identifying values preselected among an upper limit value, a representative value and a lower limit value of said respective specific items based on corner value setting data designated for said respective specific items; and carrying out said circuit simulation for each combination of said values preselected among said upper limit value, said representative value and said lower limit value of said respective specific items.

5. The computer-readable storage medium as set forth in claim 1, said automatic circuit design process further comprising:

carrying out said circuit simulation by using said values of said respective design variables for the identified circuit configuration, which are obtained by said mapping, and judging whether or not said provisional optimal solution after said reverse space conversion of said space conversion can be realized, and wherein said outputting is executed upon being judged that said provisional optimal solution after said reverse space conversion can be realized.

6. The computer-readable storage medium as set forth in claim 5, said automatic circuit design process further comprising:

upon being judged that said provisional optimal solution after said reverse space conversion cannot be realized, identifying a next candidate solution from said second Pareto optimal solutions close to said provisional optimal solution, and identifying a second circuit configuration for said next candidate solution;

mapping said next candidate solution to values of said respective design variables for the identified second circuit configuration;

judges by carrying out said circuit simulation by using said values of said respective design variables for the identified second circuit configuration, which are obtained by said mapping said next candidate solution, whether or not said next candidate solution after said reverse space conversion can be realized;

upon being judged that said next candidate solution can be realized, outputting the identified second circuit configuration and said values of said respective design variables for the identified second circuit configuration, which are obtained by said mapping said next candidate solution.

7. An automatic circuit design method, comprising:

extracting one or more kinds of circuit configurations having possibility that requirement specification is satisfied, from a circuit configuration data storage device storing data of a plurality of kinds of circuit configurations;

for each of the one or more kinds of circuit configurations, obtaining a plurality of simulation results for respective items in said requirement specification by circuit simulation while changing a value of each design variable for the circuit configuration so as to satisfy a constraint condition of the circuit configuration, extracting first Pareto optimal solutions, each of which is not dominated by other solutions, in a solution specification space for said respective items in said requirement specification, from said simulation results, wherein a first solution dominates a second solution, when all values of the respective items of the second solution are inferior to corresponding values of the respective items of the first solution, and storing respective pertinent values of said design variables and pertinent values of said respective items in said requirement specification for each of said first Pareto optimal solutions in association with the circuit configuration;

extracting second Pareto optimal solutions whose at least one of values of the respective items in said requirement specification is not inferior to a corresponding value for other solutions from among all of said first Pareto optimal solutions, for all of the one or more kinds of circuit configurations, and storing, for each of the extracted second Pareto optimal solutions, an identifier of the pertinent circuit configuration, said respective pertinent values of said design variables and said pertinent values of said respective items in said requirement specification;

calculating a provisional optimal solution whose distance from a point corresponding to said requirement specification after space conversion of said solution specification space to balance value distribution for said items in said requirement specification, is shortest and which is on a Pareto curved surface of said second Pareto optimal solutions after said space conversion is carried out for said second Pareto optimal solutions, in said solution specification space after said space conversion;

extracting a specific Pareto optimal solution close to said provisional optimal solution in said solution specification space after said space conversion, from said second Pareto optimal solutions after said space conversion is carried out for said second Pareto optimal solutions, and identifying a circuit configuration for said provisional optimal solution from the extracted specific Pareto optimal solution;

mapping said provisional optimal solution to values of said respective design variables in the identified circuit configuration; and outputting said identifier of the identified circuit configuration and said values of said respective design variables in the identified circuit configuration, which are obtained by said mapping.

8. The automatic circuit design method as set forth in claim 7, wherein said obtaining, extracting and storing comprises: carrying out said circuit simulation a plurality of times while changing values of specific items among said items that can be set in said circuit simulation, and adopting, as one simulation result of said plurality of simulation results, a result indicating worst performance among a plurality of results of said circuit simulation.

9. An automatic circuit design apparatus, comprising:

a circuit configuration data storage device storing data of a plurality of kinds of circuit configurations; and a processor configured to execute a procedure, the procedure comprising:

extracting one or more kinds of circuit configurations having possibility that requirement specification is satisfied, from said circuit configuration data storage device;

for each of the one or more kinds of circuit configurations, obtaining a plurality of simulation results for respective items in said requirement specification by circuit simulation while changing a value of each design variable for the circuit configuration so as to satisfy a constraint condition of the circuit configuration, and extracting first Pareto optimal solutions, each of which is not dominated by other solutions, in a solution specification space for said respective items in said requirement specification, from said simulation results, wherein a first solution dominates a second solution, when all values of the respective items of the second solution are inferior to corresponding values of the respective items of the first solution, and storing respective pertinent values of said design variables and pertinent values of said respective items in said requirement specification for each of said first Pareto optimal solutions in association with the circuit configuration;

extracting second Pareto optimal solutions whose at least one of values of the respective items in said requirement specification is not inferior to a corresponding value for other solutions from among all of said first Pareto optimal solutions, for all of the one or more kinds of circuit configurations, and storing, for each of the extracted second Pareto optimal solutions, an identifier of the pertinent circuit configuration, said respective pertinent values of said design variables and said pertinent values of said respective items in said requirement specification;

calculating a provisional optimal solution whose distance from a point corresponding to said requirement specification after space conversion of said solution specification space to balance value distribution for said items in said requirement specification, is shortest and which is on a Pareto curved surface of said second Pareto optimal solutions after said space conversion is carried out for said second Pareto optimal solutions, in said solution specification space after said space conversion;

extracting a specific Pareto optimal solution close to said provisional optimal solution in said solution specification space after said space conversion, from said second Pareto optimal solutions after said space conversion is carried out for said second Pareto optimal solutions, and identifying a circuit configuration for said provisional optimal solution from the extracted specific Pareto optimal solution;

mapping said provisional optimal solution to values of said respective design variables in the identified circuit configuration; and outputting said identifier of the identified circuit configuration and said values of said respective design variables in the identified circuit configuration, which are obtained by said mapping.

10. The automatic circuit design apparatus as set forth in claim 9, wherein said obtaining, extracting and storing comprises: causing a circuit simulator to carry out said circuit simulation a plurality of times while changing values of specific items among said items that can be set in said circuit simulation, and adopting, as one simulation result of said plurality of simulation results, a result indicating worst performance among a plurality of results of said circuit simulation.

\* \* \* \* \*